US008903669B1

(12) United States Patent
Holly et al.

(10) Patent No.: US 8,903,669 B1
(45) Date of Patent: *Dec. 2, 2014

(54) MULTI-BAND RECEIVER USING HARMONIC SYNCHRONOUS DETECTION

(75) Inventors: Sandor Holly, Woodland Hills, CA (US); Donald Elliot Harrington, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 915 days.

This patent is subject to a terminal disclaimer.

(21) Appl. No.: 12/504,293

(22) Filed: Jul. 16, 2009

Related U.S. Application Data

(63) Continuation-in-part of application No. 12/412,919, filed on Mar. 27, 2009, now Pat. No. 8,054,212.

(51) Int. Cl.
*G06F 19/00* (2011.01)

(52) U.S. Cl.
USPC .......................................................... 702/75

(58) Field of Classification Search
USPC .......................................................... 702/75
See application file for complete search history.

(56) References Cited

U.S. PATENT DOCUMENTS

| | | |
|---|---|---|
| 3,745,575 A | 7/1973 | Kikuchi |
| 3,775,765 A | 11/1973 | Di Piazza et al. |
| 3,831,173 A | 8/1974 | Lerner |
| 5,327,139 A | 7/1994 | Johnson |
| 5,457,394 A | 10/1995 | McEwan |
| 5,506,590 A | 4/1996 | Minter |
| 5,512,834 A | 4/1996 | McEwan |
| 5,668,342 A | 9/1997 | Discher |
| 5,819,859 A | 10/1998 | Stump et al. |
| 5,900,833 A | 5/1999 | Sunlin et al. |
| 6,057,765 A | 5/2000 | Jones et al. |
| 6,060,815 A | 5/2000 | Nysen |
| 6,094,157 A | 7/2000 | Cowdrick |
| 6,163,259 A | 12/2000 | Barsumian et al. |
| 6,438,468 B1 | 8/2002 | Muxlow et al. |

(Continued)

FOREIGN PATENT DOCUMENTS

| | | |
|---|---|---|
| WO | WO 00/77614 A2 | 12/2000 |
| WO | WO 2006/110991 A1 | 10/2006 |
| WO | 2009099710 A1 | 8/2009 |

OTHER PUBLICATIONS

USPTO Office Action dated Aug. 26, 2011 for U.S. Appl. No. 11/758,785.

(Continued)

*Primary Examiner* — Tung S Lau
(74) *Attorney, Agent, or Firm* — Yee & Associates, P.C.

(57) ABSTRACT

A method and apparatus for detecting an object. A first collimated beam having a first frequency and a second collimated beam having a second frequency is transmitted. At least one of the first frequency and the second frequency is changed through a range of frequencies and a power level for at least one of the first collimated beam and the second collimated beam is changed through a range of power levels. A range of fundamental difference frequency signals for each power level in the range of power levels are monitored for, in response to transmitting the first collimated beam and the second collimated beam using the range of frequencies and the range of power levels. The range of fundamental difference frequency signals is generated by the object having non-linear electrical characteristics in response to receiving the first collimated beam and the second collimated beam.

20 Claims, 11 Drawing Sheets

(56) References Cited

U.S. PATENT DOCUMENTS

| | | | |
|---|---|---|---|
| 6,501,414 | B2 | 12/2002 | Arndt et al. |
| 6,522,285 | B2 | 2/2003 | Stolarczyk et al. |
| 6,545,945 | B2 | 4/2003 | Caulfield |
| 6,671,589 | B2 | 12/2003 | Holst et al. |
| 6,765,527 | B2 | 7/2004 | Jablonski et al. |
| 6,795,754 | B2 | 9/2004 | Sunami et al. |
| 6,864,825 | B2 | 3/2005 | Holly |
| 6,894,624 | B2 | 5/2005 | Kim et al. |
| 6,897,777 | B2 | 5/2005 | Kim et al. |
| 6,943,742 | B2 | 9/2005 | Holly |
| 6,950,076 | B2 | 9/2005 | Holly |
| 6,999,041 | B2 | 2/2006 | Holly |
| 7,009,575 | B2 | 3/2006 | Holly et al. |
| 7,130,624 | B1 | 10/2006 | Jackson et al. |
| 7,142,147 | B2 | 11/2006 | Holly |
| 7,162,285 | B2 | 1/2007 | Owens et al. |
| 7,190,302 | B2 | 3/2007 | Biggs |
| 7,366,589 | B2 | 4/2008 | Habermas |
| 7,473,898 | B2 | 1/2009 | Holly et al. |
| 7,486,250 | B2 | 2/2009 | Vertovee et al. |
| 7,500,238 | B2 | 3/2009 | Nestoryak |
| 7,512,511 | B1 | 3/2009 | Schultz et al. |
| 7,515,094 | B2 | 4/2009 | Keller, III |
| 7,528,762 | B2 | 5/2009 | Cerwin |
| 7,557,710 | B2 | 7/2009 | Sanchez et al. |
| 7,636,568 | B2 | 12/2009 | Gould et al. |
| 7,769,501 | B2 | 8/2010 | Lusardi et al. |
| 7,777,671 | B2 | 8/2010 | Schnitzer et al. |
| 7,778,213 | B2 | 8/2010 | Alrabady et al. |
| 7,827,549 | B2 | 11/2010 | Tarassov |
| 7,893,862 | B2 | 2/2011 | Holly et al. |
| 8,015,794 | B2 | 9/2011 | Winkler et al. |
| 8,035,550 | B2 | 10/2011 | Holly et al. |
| 8,051,031 | B2 | 11/2011 | Sims, III et al. |
| 8,054,212 | B1 | 11/2011 | Holly et al. |
| 8,054,213 | B2 * | 11/2011 | Holly et al. .................... 342/22 |
| 8,055,393 | B2 | 11/2011 | Sims, III et al. |
| 2002/0011947 | A1 | 1/2002 | Stolarczyk et al. |
| 2002/0111720 | A1 | 8/2002 | Holst et al. |
| 2002/0175849 | A1 | 11/2002 | Arndt et al. |
| 2003/0028899 | A1 | 2/2003 | MacInnis |
| 2003/0041236 | A1 | 2/2003 | Nestoryak |
| 2004/0106404 | A1 | 6/2004 | Gould et al. |
| 2005/0026609 | A1 | 2/2005 | Brinkley et al. |
| 2005/0062639 | A1 | 3/2005 | Biggs |
| 2005/0064922 | A1 | 3/2005 | Owens et al. |
| 2005/0200550 | A1 | 9/2005 | Vetrovec et al. |
| 2005/0256614 | A1 | 11/2005 | Habermas |
| 2005/0288831 | A1 | 12/2005 | Lusardi et al. |
| 2006/0082488 | A1 | 4/2006 | Keller, III |
| 2006/0109159 | A1 * | 5/2006 | Holly .......................... 342/13 |
| 2006/0206587 | A1 | 9/2006 | Fabbrocino |
| 2007/0013577 | A1 | 1/2007 | Schnitzer et al. |
| 2007/0024489 | A1 | 2/2007 | Cerwin |
| 2007/0046791 | A1 | 3/2007 | Wang et al. |
| 2008/0092518 | A1 | 4/2008 | Winkler et al. |
| 2008/0127171 | A1 | 5/2008 | Tarassov |
| 2008/0127175 | A1 | 5/2008 | Naranjo et al. |
| 2008/0295090 | A1 | 11/2008 | Bestle et al. |
| 2009/0040093 | A1 * | 2/2009 | Holly et al. .................... 342/22 |
| 2009/0198393 | A1 | 8/2009 | Sims, III et al. |
| 2009/0198712 | A1 | 8/2009 | Sims, III et al. |
| 2010/0001899 | A1 | 1/2010 | Holly et al. |
| 2011/0231150 | A1 | 9/2011 | Burns et al. |
| 2012/0146767 | A1 | 6/2012 | Holly et al. |

OTHER PUBLICATIONS

Wilson et al., "Improvised Explosive Devices (IEDs) in Iraq and Afghanistan: Effects and Countermeaures", CRS Report for Congress, updated Nov. 21, 2007, pp. 1-6.
U.S. Appl. No. 11/758,787, filed Jun. 6, 2007, Holly et al.
U.S. Appl. No. 12/412,919, filed Mar. 27, 2009, Holly et al.
U.S. Appl. No. 12/481,941, filed Jun. 10, 2009, Burns et al.
USPTO Notice of Allowance for U.S. Appl. No. 12/206,918 dated Jul. 22, 2011.
USPTO Notice of Allowance for U.S. Appl. No. 12/026,926 dated Jul. 13, 2011.
U.S. Appl. No. 11/758,785, filed Jun. 6, 2007, Holly et al.
Thomas, "Common Airborne Instrumentation System: A Fresh Look", Accession No. ADA392006, Naval Air Warfare Center Aircraft Div Patuxent River MD, Jul. 2001.
Brada, "Metadata Support for Safe Component Upgrades", Proc. of Compsac '02, 26th Annual Intl Computer Software & Applications Conf., Oxford England, IEEE Aug. 2002.
USPTO office action for U.S. Appl. No. 12/026,918 dated Feb. 3, 2011.
USPTO office action for U.S. Appl. No. 12/026,926 dated Mar. 14, 2011.
USPTO Ex Parte Quayle Action, dated Mar. 19, 2010, regarding U.S. Appl. No. 12/167,753, 4 pages.
USPTO Notice of Allowance, dated Jun. 19, 2012, regarding U.S. Appl. No. 11/758,785, 12 pages.
USPTO Notice of Allowance, dated Jun. 20, 2012, regarding U.S. Appl. No. 11/758,787, 12 pages.
USPTO Notice of Allowance, dated May 24, 2012, regarding U.S. Appl. No. 12/481,941, 12 pages.
USPTO Office Action dated Sep. 27, 2011 for U.S. Appl. No. 11/758,787, pp. 17.
USPTO Office Action dated Aug. 21, 2009 for U.S. Appl. No. 12/167,753, pp. 10.
USPTO Final Office Action dated Jan. 5, 2010 for U.S. Appl. No. 12/167,753, pp. 8.
USPTO Office Action dated Jul. 9, 2010 for U.S. Appl. No. 12/167,753, pp. 5.
USPTO Notice of Allowance dated Oct. 18, 2010 for U.S. Appl. No. 12/167,753, pp. 7.
USPTO Office Action dated Apr. 28, 2010 for U.S. Appl. No. 12/026,918, pp. 22.
USPTO Final Office Action dated Aug. 27, 2010 for U.S. Appl. No. 12/026,918, pp. 14.
USPTO Office Action dated Oct. 19, 2010 for U.S. Appl. No. 12/026,926, pp. 16.
USPTO Notice of Allowance dated Sep. 13, 2011 for U.S. Appl. No. 12/412,919, pp. 20.
USPTO Final Office Action dated Feb. 10, 2012 for U.S. Appl. No. 11/758,785, pp. 5.
USPTO Notice of Allowance dated Mar. 8, 2012 for U.S. Appl. No. 11/758,787, pp. 10.
USPTO Office Action dated Feb. 10, 2012 for U.S. Appl. No. 12/481,941, pp. 26.
International Search Report dated Mar. 6, 2009, regarding Application No. PCT/US2009/030652 (WO 2009099710), 3 pages.
PCT Application No. PCT/US2009/030652, filed Jan. 9, 2009, 32 pages.

* cited by examiner

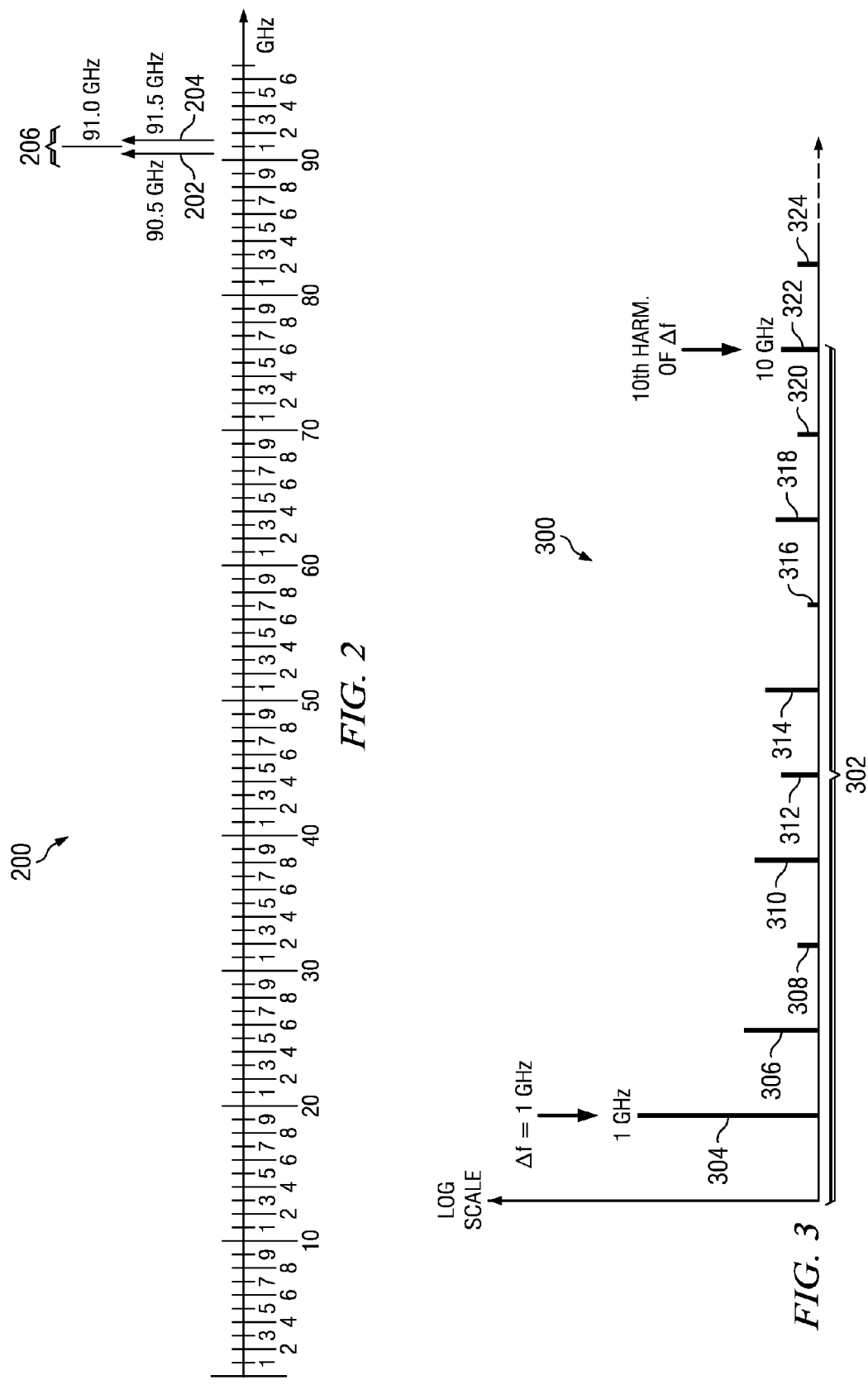

MULTI-BAND RECEIVER USING HARMONIC SYNCHRONOUS DETECTION

GOVERNMENT LICENSE RIGHTS

This invention was made with Government support under contract number N00174-08-C-0031 awarded by the United States Navy. The Government has certain rights in this invention.

BACKGROUND INFORMATION

1. Field

The present disclosure relates generally to detecting objects. More particularly, the present disclosure relates to a method and apparatus for detecting objects using electromagnetic radiation.

2. Background

Improvised explosive devices are bombs constructed and deployed in manners not normally used by conventional military organizations. Improvised explosive devices may be used by terrorists, guerillas, and other forces. Improvised explosive devices may be placed on a roadway. In some cases, an improvised explosive device may be carried in a car, a truck, or by a person.

An improvised explosive device may have a power supply, a trigger, a detonator, a main charge, and a container. The improvised explosive device also may include shrapnel-generating objects, such as nails or ball bearings.

The trigger is a mechanism to set off the device. The trigger may be, for example, a radio signal, a tripwire, a timer, or a firing button. Improvised explosive devices have employed cell phones, cordless phones, garage door openers, and/or other types of electronic devices.

To counter improvised explosive devices, jamming systems have been employed to prevent setting off improvised explosive devices. Although jamming systems may be used to prevent setting off improvised explosive devices, these types of jamming systems do not detect the presence of or disarm the device.

Additionally, various technologies have been used to identify improvised electronic devices. These technologies involve using radar, x-rays, and pre-detonators. For example, some detection systems include a stoichiometric diagnostic device. This type of device is capable of deciphering chemical signatures of unknown substances through metal or other barriers. An example of another detection device is a laser-induced breakdown spectroscopy system. This type of system is capable of detecting traces of explosives used for improvised explosive devices from distances such as 30 meters. Some improvised explosive devices, however, may not emit chemicals or have detectable amounts of explosives.

Therefore, it would be advantageous to have a method and apparatus that takes into account one or more of the issues discussed above, as well as possibly other issues.

SUMMARY

In one advantageous embodiment, an apparatus comprises a transmitter system, a receiver system, and a processor unit. The transmitter system is capable of transmitting a first collimated beam having a first frequency and a second collimated beam having a second frequency. The receiver system is capable of monitoring for a fundamental difference frequency signal having a difference frequency equal to a difference between the first frequency and the second frequency. The fundamental difference frequency signal is generated by an object having non-linear electrical characteristics in response to receiving the first collimated beam and the second collimated beam. The processor unit is connected to the transmitter system and the receiver system. The processor unit is capable of controlling an operation of the transmitter system and the receiver system to change at least one of the first frequency and the second frequency through a range of frequencies. The processor unit is capable of controlling the operation of the transmitter system and the receiver system to change a power level of at least one of the first collimated beam and the second collimated beam through a range of power levels. The processor unit is also capable of controlling an operation of the transmitter system and the receiver system to detect a range of fundamental difference frequency signals for each power level in the range of power levels in response to the transmitter system transmitting the first collimated beam and the second collimated beam using the range of frequencies and the range of power levels.

In another advantageous embodiment, an apparatus comprises a transmitter system, a receiver system, and a processor unit. The transmitter system is capable of transmitting first electromagnetic signals having a first frequency and second electromagnetic signals having a second frequency. The receiver system is capable of monitoring for a fundamental difference frequency signal having a difference frequency equal to a difference between the first frequency and the second frequency. The fundamental difference frequency signal is generated by an object having non-linear electrical characteristics in response to receiving the first electromagnetic signals and the second electromagnetic signals. The processor unit is connected to the transmitter system and the receiver system. The processor unit is capable of controlling an operation of the transmitter system and the receiver system to change at least one of the first frequency and the second frequency through a range of frequencies. The processor unit is capable of controlling the operation of the transmitter system and the receiver system to change a power level of at least one of the first electromagnetic signals and the second electromagnetic signals through a range of power levels. The processor unit is also capable of controlling the operation of the transmitter system and the receiver system to detect a range of fundamental difference frequency signals for each power level in the range of power levels in response to the transmitter system transmitting the first electromagnetic signals and the second electromagnetic signals using the range of frequencies and the range of power levels.

In yet another advantageous embodiment, a method is present for detecting an object. A first collimated beam having a first frequency and a second collimated beam having a second frequency is transmitted. At least one of the first frequency and the second frequency is changed through a range of frequencies, and a power level for at least one of the first collimated beam and the second collimated beam is changed through a range of power levels. A range of fundamental difference frequency signals for each power level in the range of power levels are monitored for, in response to transmitting the first collimated beam and the second collimated beam using the range of frequencies and the range of power levels. The range of fundamental difference frequency signals is generated by the object having non-linear electrical characteristics in response to receiving the first collimated beam and the second collimated beam.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 2 is a diagram illustrating locations of a pair of millimeter wave frequencies that may be used to transmit collimated beams on the direct current to millimeter spectral domain in accordance with an advantageous embodiment;

FIG. 3 is a diagram illustrating a difference frequency and harmonics of the fundamental difference frequency that may be obtained by transmitting a first collimated beam and a second collimated beam at an object in accordance with an advantageous embodiment;

DETAILED DESCRIPTION

Figure 1:
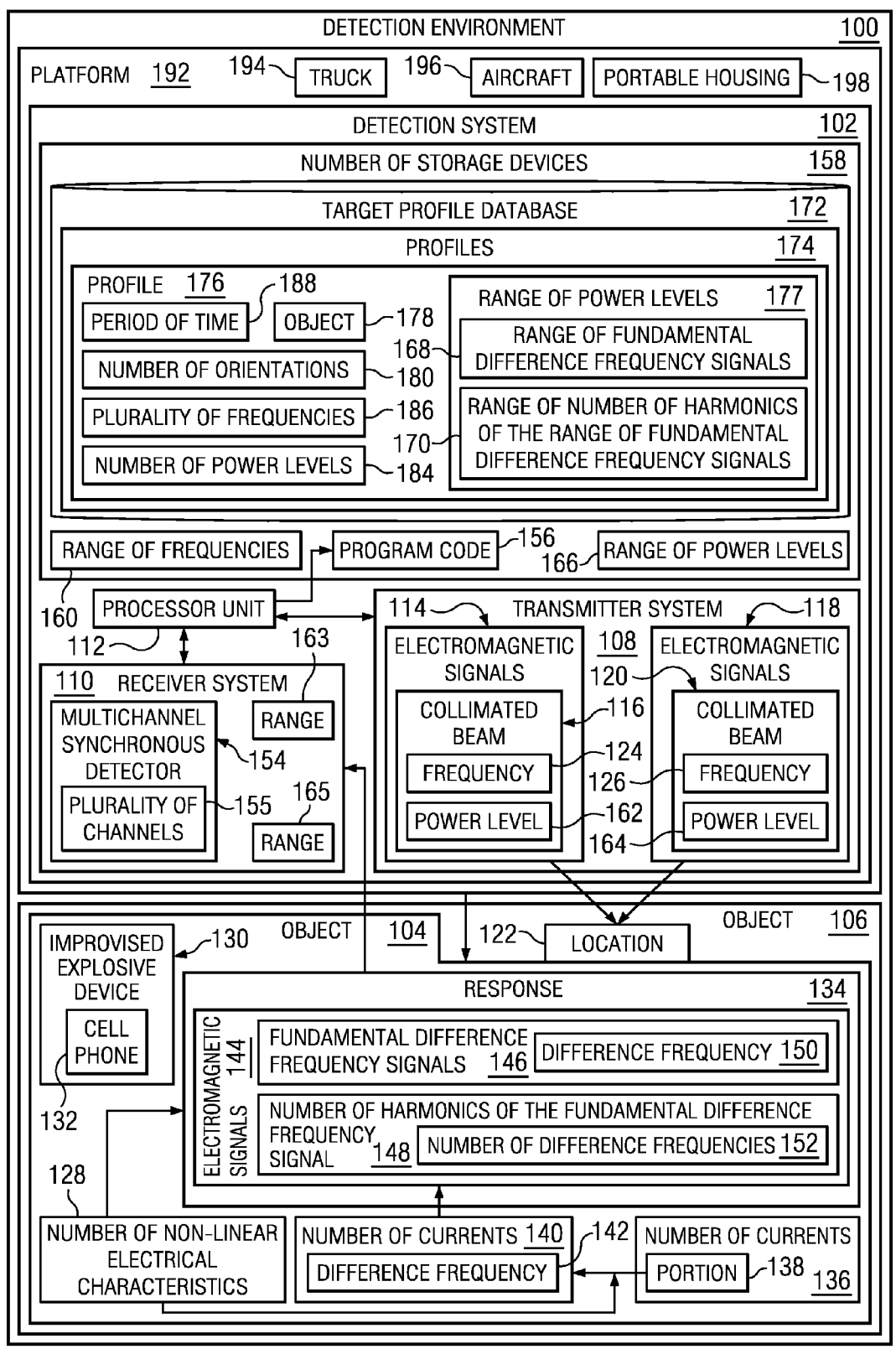
FIG. 1 is a diagram illustrating a detection environment in accordance with an advantageous embodiment.

The different advantageous embodiments recognize and take into account that currently available systems for countering improvised explosive devices may be unable to detect a presence of an improvised explosive device. For example, the different advantageous embodiments recognize and take into account that jamming systems may prevent an improvised explosive device from being detonated.

Detonation is prevented only while the jamming system is active and/or is located in a location around the improvised explosive device. Once the jamming system is moved or turned off, the improvised explosive device may still be used and pose danger and/or hazard to vehicles and/or personnel in the vicinity of the improvised explosive device.

Further, some currently used techniques may be able to detect a presence of an improvised explosive device but are unable to identify the particular type of device. The different advantageous embodiments recognize and take into account that knowing the type of device being used may aid in disarming or avoiding the device.

Thus, the different advantageous embodiments provide a method and apparatus for detecting objects. These objects may include, for example, improvised explosive devices or any other suitable type of object that has non-linear electrical characteristics. In some of the advantageous embodiments, an apparatus comprises a transmitter, a receiver system, and a processor unit. The transmitter system is capable of transmitting a first collimated beam having a first frequency and a second collimated beam having a second frequency.

The receiver system is capable of monitoring for a fundamental difference frequency signal having a difference frequency equal to a difference between the first frequency and the second frequency. The fundamental difference frequency signal is generated by an object having non-linear electrical characteristics in response to receiving the first collimated beam and the second collimated beam.

The processor unit is capable of controlling the operation of the transmitter system to change at least one of the first frequency and the second frequency and to change a power level of at least one of a first difference frequency signal and a second difference frequency signal through a range of power levels. Further, the processor unit is capable of detecting a range of fundamental difference frequency signals for each power level in the range of power levels in response to the transmitter system transmitting the first collimated beam and the second collimated beam using a range of frequencies and the range of power levels.

This response is used to detect the object. In detecting the object, a presence of the object may be detected and/or an identification of the object may be made. In these depicted examples, the response is a two-dimensional signature in which the dimensions are the change in frequency and the change in power level. The response is compared to profiles for objects to identify the object.

With reference now to FIG. 1, a diagram illustrating a detection environment is depicted in accordance with an advantageous embodiment. In this illustrative example, detection environment 100 includes detection system 102. Detection system 102 may be used to identify object 104.

In these illustrative examples, non-linear radar technology is used by detection system 102 to detect object 104. In these illustrative examples, detecting object 104 comprises at least one of detecting a presence of object 104 and identifying object 104. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In the illustrative examples, object 104 may be detected by detection system 102, even if object 104 is hidden by object 106. Object 104 may be hidden behind object 106, located within object 106, or under object 106 in these examples. Object 106 may be, for example, without limitation, a box, fog, the ground, and/or some other object that may be used to obscure and/or hide object 104 from view. Of course, in some examples, object 104 may not be obscured by object 106.

In these illustrative examples, detection system 102 includes transmitter system 108, receiver system 110, and processor unit 112. Transmitter system 108 is capable of transmitting electromagnetic signals 114 in the form of collimated beam 116 and electromagnetic signals 118 in the form of collimated beam 120. A collimated beam is electromagnetic radiation in the form of rays that are substantially parallel. A collimated beam will spread more slowly as the electromagnetic radiation propagates as compared to electromagnetic radiation that has not been collimated. Collimated beam 116 and collimated beam 120 may have substantially the same intensities. These beams also may have substantially parallel aligned polarizations at location 122.

Collimated beam 116 and collimated beam 120 are generated by transmitter system 108 in a manner such that collimated beam 116 and collimated beam 120 merge at location 122 for object 104.

Collimated beam 116 has frequency 124, while collimated beam 120 has frequency 126. Frequency 124 is different from frequency 126 in these illustrative examples.

In the depicted examples, object 104 has number of non-linear electrical characteristics 128. Electrical characteristics may include, for example, without limitation, conductive, capacitive, inductive, and/or other types of electrical characteristics.

A number, as used herein, when referring to items means one or more items. For example, number of non-linear electrical characteristics 128 is one or more non-linear electrical characteristics. As another example, number of non-linear electrical characteristics 128 may be two different types of metals in layers in object 104. Number of non-linear electrical characteristics 128 may be, for example, without limitation, a corroded or oxidized portion of a surface of an object that has a different non-linear electrical characteristic from a non-corroded or non-oxidized portion of object 104.

As yet another example, object 104 may include a number of electronic circuits with non-linear components. These non-linear components may be, for example, without limitation, diodes, transistors, and/or some other suitable components with non-linear electrical characteristics.

In these illustrative examples, object 104 may be improvised explosive device 130 containing cell phone 132 as a trigger. Cell phone 132 contains components with number of non-linear electrical characteristics 128 in these illustrative examples. Cell phone 132 may contain non-linear components, such as diodes, transistors, and/or other suitable components that have number of non-linear electrical characteristics 128.

The particular components located within cell phone 132 and/or the arrangement of the components are used to identify cell phone 132 as a cell phone using detection system 102. Also, a particular model and type may be identified for cell phone 132 based on the non-linear components making up cell phone 132. Of course, object 104 may be any object containing number of non-linear electrical characteristics 128.

When electromagnetic signals 114 and electromagnetic signals 118 encounter object 104, response 134 is generated by number of non-linear electrical characteristics 128 in object 104. Electromagnetic signals 114 and electromagnetic signals 118 cause number of currents 136 to be induced during the duration of electromagnetic signals 114 and electromagnetic signals 118 encountering object 104.

Portion 138 of number of currents 136 may be converted to and/or rectified by number of non-linear electrical characteristics 128 into number of currents 140 that oscillate at difference frequency 142. Difference frequency 142 is a frequency that is the difference between frequency 124 and frequency 126 for electromagnetic signals 114 and electromagnetic signals 118. Number of currents 140 then reradiate as electromagnetic signals 144 to form response 134. Response 134 is detected by receiver system 110 in these examples.

Difference frequency 142 is selected to be a different frequency from frequency 124 and frequency 126. In this manner, receiver system 110 is insensitive to background noise that may be caused by reflections of collimated beam 116 and collimated beam 120 by object 104, object 106, and/or other objects or materials. Further, collimated beam 116 and collimated beam 120 may be transmitted at higher intensities without worrying about electromagnetic signals 114 and electromagnetic signals 118 coupling into receiver system 110 and possibly blinding and/or saturating receiver system 110.

In these illustrative examples, receiver system 110 detects fundamental difference frequency signal 146 and number of harmonics of the fundamental difference frequency signal 148 within electromagnetic signals 144 forming response 134. Fundamental difference frequency signal 146 has difference frequency 150.

Number of harmonics of the fundamental difference frequency signal 148 has number of difference frequencies 152. Each of number of harmonics of the fundamental difference frequency signal 148 is a harmonic of fundamental difference frequency signal 146. In other words, each of number of difference frequencies 152 is a harmonic of difference frequency 150. Each frequency in number of difference frequencies 152 is an integer multiple of difference frequency 150.

In these illustrative examples, receiver system 110 may comprise multichannel synchronous detector 154. Multichannel synchronous detector 154 has plurality of channels 155. In these examples, each of plurality of channels 155 may process a band from the multiple bands of frequencies that are formed by fundamental difference frequency signal 146 and number of harmonics of the fundamental difference frequency signal 148.

Each of these channels may be capable of receiving a frequency from difference frequency 150 and number of difference frequencies 152. Plurality of channels 155 functions as parallel channels to process different portions of and are used to increase the speed at which response 134 is processed. Of course, in other advantageous embodiments, a single channel may be used to process all of the different frequencies, depending on the particular implementation.

In these examples, processor unit 112 executes program code 156 in number of storage devices 158 to control the operation of transmitter system 108 and receiver system 110. Processor unit 112 may be, for example, a central processing unit, a plurality of processors, a multi-core processor, or some other suitable type of processing system.

Number of storage devices 158 may be, for example, a memory, a persistent storage, a random access memory, a hard disk drive, a solid state disk drive, a thumb drive, a memory stick, or some other suitable type of storage device. Program code 156 is stored on number of storage devices 158 in a functional form for execution by processor unit 112. Program code 156 may be stored on one or more of number of storage devices 158 in these examples.

Program code 156 can be executed by processor unit 112 to control transmitter system 108 to change at least one of frequency 124 and frequency 126 through range of frequencies 160. In the different advantageous embodiments, the frequency ranges used may vary, depending on the particular application.

Frequency 124 and frequency 126 may be selected from a number of different frequencies. For example, without limitation, frequency 124 and frequency 126 may be selected from frequencies in ranges, such as those for very high frequency (VHF) signals, ultra high frequency (UHF) signals, microwave signals, millimeter wave signals, and/or other suitable types of signals. These signals may vary in frequency from around 30 megahertz to around 300 gigahertz in the illustrative examples. Of course, other ranges of frequencies also may be used, depending on the particular implementation.

For example, frequencies from around 75 gigahertz to around 110 gigahertz may be used in the different advantageous embodiments. The use of higher or lower frequency bands may be used in different embodiments. Of course, this range may change, depending on the particular application and where the object may be located.

Additionally, processor unit 112 is capable of operating transmitter system 108 to change at least one of power level 162 for collimated beam 116 and power level 164 for collimated beam 120 through range of power levels 166. For example, processor unit 112 may control transmitter system 108 to transmit collimated beam 116 and collimated beam 120 in which at least one of frequency 124 and frequency 126 are changed through range of frequencies 160 at power level 162 for collimated beam 116 and at power level 164 for collimated beam 120. In these illustrative examples, the value for power level 162 and power level 164 may be the same or different. One of power level 162 and power level 164 or both power levels may be changed through range of power levels 166.

After range of frequencies 160 has been used, processor unit 112 may control transmitter system 108 to change at least one of power level 162 and power level 164 to an unused power level. Thereafter, processor unit 112 controls transmitter system 108 to transmit collimated beam 116 and collimated beam 120 in which at least one of frequency 124 and frequency 126 are changed through range of frequencies 160 at another unused power level. After range of frequencies 160 has been used for the unused power level, the power level may again be changed to another unused power level in range of power levels 166 until range of power levels 166 has been used.

Processor unit 112 is capable of operating receiver system 110 to detect range 163 of fundamental difference frequency signal 146 and range 165 of number of harmonics of the fundamental difference frequency signal 148 for each power level used within range of power levels 166. The response of object 104 to range of frequencies 160 and range of power levels 166 forms response 134.

Program code 156 may be executed by processor unit 112 to identify object 104 in addition to detecting a presence of object 104 as part of a detection process. For example, the identification of object 104 may be performed using target profile database 172.

Target profile database 172 contains object profiles. Each profile within profiles 174 contains information needed to determine whether response 134 is for an object within profiles 174. For example, profile 176 is for object 178 and contains range of fundamental difference frequency signals 168 and range of number of harmonics of the range of fundamental difference frequency signals 170 for range of power levels 177. Profile 176 also may include information derived from the different signals.

Further, range of fundamental difference frequency signals 168 and range of number of harmonics of the range of fundamental difference frequency signals 170 are present for range of power levels 166. In other words, range of fundamental difference frequency signals 168 and range of number of harmonics of the range of fundamental difference frequency signals 170 are present for each power level in range of power levels 166. Further, this information may be present for number of orientations 180. These different signals may have a different characteristic at different orientations of object 178.

As a result, with number of orientations 180, the likelihood of being able to identify object 104 as object 106 may be increased by increasing number of orientations 180. Further, number of orientations 180 for object 104 may be identified from response 134 in the different illustrative examples. Three orthogonal orientations of object 178 may be present in number of orientations 180 for object 178. Of course, other numbers of orientations may be used, depending on the particular application.

Profile 176 also may include number of power levels 184 and plurality of frequencies 186. Number of power levels 184 and plurality of frequencies 186 may provide information needed to damage object 178 in the depicted examples. Range of power levels 166 may define a power level for at least one of power level 162 and power level 164 for use in damaging object 178.

Plurality of frequencies 186 may be used to set frequency 124 in collimated beam 116 and frequency 126 in collimated beam 120 for use in damaging object 178. Plurality of frequencies 186 may identify multiple frequencies at which different components in an object may be damaged. Additionally, profile 176 also may include period of time 188. Period of time 188 may be used to identify a period of time for which different power levels and frequencies within number of power levels 184 and plurality of frequencies 186 should be used to damage object 178.

The different advantageous embodiments take into account that the harmonics may be generated in the reradiated difference frequency signals. Depending on the intensity of collimated beam 116 and collimated beam 120 at location 122, a dozen or more higher harmonics of the fundamental difference frequency signals may be present in number of harmonics of the fundamental difference frequency signal 148.

In these examples, intensity is power density in watts per square meter. With multichannel synchronous detector 154, all of the number of harmonics of the fundamental difference frequency signal 148 in response 134 may be detected simultaneously or substantially at the same time response 134 is received by receiver system 110.

Unique characteristics may be present in fundamental difference frequency signal 146 and number of harmonics of the fundamental difference frequency signal 148 based on number of non-linear electrical characteristics 128 in object 104. The result of the comparison may be used to identify object 104, which is unknown in this illustrative example. These characteristics may be further identified by range 163 of fundamental difference frequency signal 146 and range 165 of number of harmonics of the fundamental difference frequency signal 148 in these illustrative examples.

In the different advantageous embodiments, response 134 is recorded and analyzed in real time. These signals are compared to profiles 174 in target profile database 172. The comparison is used to determine whether object 104 matches a profile in profiles 174 in target profile database 172. The determination may identify object 104 as known in target profile database 172. The determination also may identify object 104 as an unknown object within target profile database 172.

In this manner, the different advantageous embodiments provide a capability to not only detect a presence of object 104, but also a possibility of identifying object 104. The different advantageous embodiments also provide a capability to detect the orientation of object 104 in some cases. Further, in some cases, location 122 of object 104 is known, but the identity of object 104 is unknown.

One or more of the different advantageous embodiments also may provide a capability to damage object 104. In these illustrative examples, the damage to object 104 may be performed using information such as, for example, number of power levels 184, plurality of frequencies 186, and period of time 188 in profile 176.

Further, in the different advantageous embodiments, a detection of the damage may be made through analyzing response 134. The information for range of frequencies 160 for each power level in range of power levels 166 may be compared to profiles 174. This comparison may indicate when a component in object 104 has been damaged. For example, response 134 may indicate that cell phone 132 has been damaged. This damage may be such that cell phone 132 is no longer capable of being operated. As a result, improvised explosive device 130 may be neutralized or cease to become a threat.

Further, in some advantageous embodiments, profiles 174 in target profile database 172 may be used to identify objects that may not need to be removed or destroyed. For example, object 104 may be identified as a hidden transmitter or camera used or owned by the organization operating detection system 102.

When transmitting electromagnetic signals 114 and electromagnetic signals 118 through range of power levels 166, the time spent in transmitting at a particular power level may be longer at some power levels as compared to other power levels. For example, processor unit 112 may operate transmitter system 108 to repeat transmission of electromagnetic signals 114 and electromagnetic signals 118 through a particular pair of frequencies within range of frequencies 160 multiple times.

Further, in some advantageous embodiments, transmitter system 108 may be operated to transmit electromagnetic signals 114 and electromagnetic signals 118 at a particular pair of frequencies for those signals at a selected power level within range of power levels 166 for some period of time. This may be a period of time sufficient to damage one or more components within object 104.

The illustration of detection environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, transmitter system 108 may transmit additional collimated beams in addition to collimated beams 116 and 120 to generate additional responses in addition to response 134. Further, these additional collimated beams may be directed at object 104 or other objects at the same time. As yet another example, in some advantageous embodiments, the processing of response 134 may be performed at a location remote to detection system 102.

In these illustrative examples, detection system 102 may be associated with platform 192. In other words, detection system 102 may be located on, attached to, or otherwise associated with platform 192. Platform 192 may take a number of different forms, depending on the particular implementation. For example, platform 192 may be truck 194, aircraft 196, portable housing 198, and/or some other suitable type of platform. In yet other advantageous embodiments, the range for frequencies may be a single frequency.

As yet another example, in some advantageous embodiments, electromagnetic signals 144 received for fundamental difference frequency signal 146 and number of harmonics of the fundamental difference frequency signal 148 over range of frequencies 160 for one power level within range of power levels 166 may be considered a single response. As a result, multiple responses may be present to form a signature for comparison to profiles 174. Although the manner in which a response is defined may be different, the same information is received and compared to profiles 174 whether the information is in response 134 or in a plurality of "responses".

The ranges for the frequencies and the power levels are continuous ranges in these examples. In yet other advantageous embodiments, the ranges for the frequencies and power levels may be discontinuous. For example, a power level may have two or more segments in which gaps are present between the segments.

In these illustrative examples, response 134 includes number of harmonics of the fundamental difference frequency signal 148. In other advantageous embodiments, the harmonics may be omitted and only fundamental difference frequency signal 146 may be included in response 134.

FIGS. 2-6 illustrate signals that may be transmitted and detected using the different advantageous embodiments. These illustrations are meant only as examples of one manner in which the different frequencies may be used.

Turning now to FIG. 2, a diagram illustrating locations of a pair of millimeter wave frequencies that may be used to transmit collimated beams on the direct current to millimeter wave spectral domain is depicted in accordance with an advantageous embodiment. Millimeter wave signals have a wavelength from around one centimeter to around one millimeter and have a frequency from around 30 gigahertz to around 300 gigahertz. In this illustrative example, graph 200 illustrates the electromagnetic frequency range from around zero hertz direct current (DC) to around 100 gigahertz.

In the illustrative examples, detection system 102 in FIG. 1 may generate collimated beam 116 and collimated beam 120 having frequencies of around 90.5 gigahertz at point 202 and around 91.5 gigahertz at point 204, respectively. These two frequencies have difference frequency 206, which is around one gigahertz in these illustrative examples.

Turning now to FIG. 3, a diagram illustrating a difference frequency and harmonics of the fundamental difference frequency that may be obtained by transmitting a first collimated beam and a second collimated beam at an object is depicted in accordance with an advantageous embodiment. In these examples, the fundamental difference frequency may be around one gigahertz.

The harmonics of the fundamental difference frequency at around one gigahertz may be, for example, without limitation, two gigahertz, three gigahertz, four gigahertz, five gigahertz, and/or some other suitable integer of the fundamental difference frequency. In graph 300, frequency band 302 contains harmonics of the fundamental difference frequency that may be obtained. The X-axis represents the frequency in gigahertz, while the Y-axis represents the amplitude.

Point 304 represents the fundamental difference frequency created by the difference between frequency 126 and frequency 124 for collimated beam 120 and collimated beam 116 in FIG. 1. Points 306, 308, 310, 312, 314, 316, 318, 320, 322, and 324 represent harmonics of the fundamental difference frequency at point 304. In this illustrative example, the vertical lengths associated with the points in graph 300 are depicted for illustrative purposes only.

Figure 4:
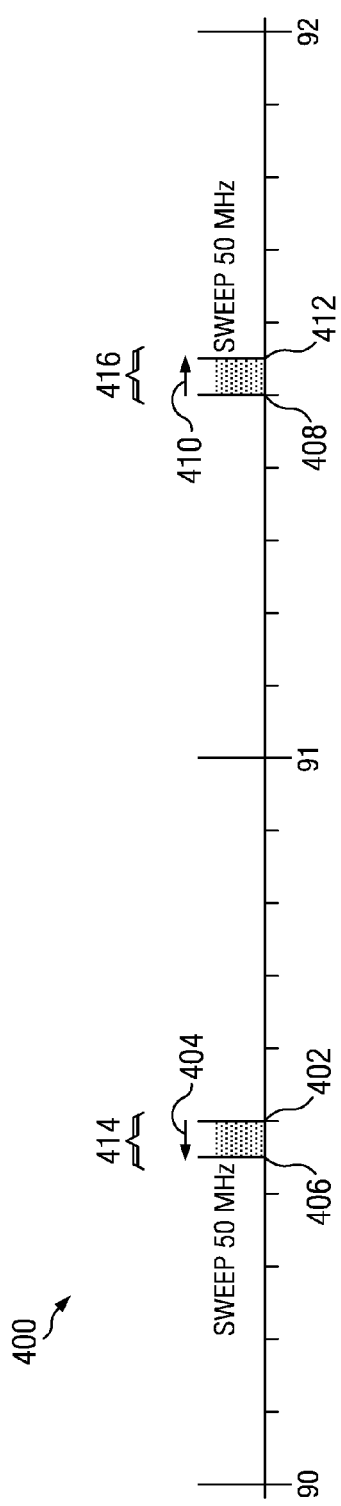
FIG. 4 is a diagram illustrating frequencies of beams that are swept over a range of frequencies for a first collimated beam and a second collimated beam in accordance with an advantageous embodiment.

Turning now to FIG. 4, a diagram illustrating frequencies of beams that are swept over a range of frequencies for a first collimated beam and a second collimated beam is depicted in accordance with an advantageous embodiment. These frequencies are depicted on the frequency domain in this example. In these illustrative examples, the frequencies may be swept over a range of frequencies by changing the frequency.

The change, in these examples, may be in a sequential manner in which each frequency is either higher or lower than the previous frequency, depending on the direction of the sweep of the frequencies. In this depicted example, graph 400 illustrates changing the frequencies for electromagnetic signals within collimated beam 116 and collimated beam 120 in FIG. 1. The X-axis represents frequency in gigahertz, while the Y-axis represents the amplitude of the signal.

In this example for collimated beam 116, the frequency starts at point 402 and moves in the direction of arrow 404 to point 406. For collimated beam 120, the frequency starts at point 408 and is swept in the direction of arrow 410 towards the frequency at point 412. A frequency is swept through a range of frequencies by starting at one end of the range and changing the frequency upwards or downwards to the other end of the range of frequencies.

In this example, the frequency range of sweep in section 414 between point 402 and point 406 is 50 megahertz. In a similar fashion, the frequency range of sweep in section 416 between point 408 and point 412 is 50 megahertz. The composite shifting of the frequencies for these collimated beams results in a total difference frequency range of sweep that is 100 megahertz. In these examples, the frequency range may be a selected amount such as, for example, without limitation, 50,000 hertz, 50 megahertz, 100 megahertz, or some other selected amount.

In the different advantageous embodiments, the width of frequency sweeps selected may be between around 10 percent to around 20 percent of the fundamental difference frequency band used. In other advantageous embodiments, other widths may be selected other than those described above. Accordingly, in this example, section 414 and section 416 provide a 100 megahertz sweep range. Of course, in other advantageous embodiments, only one frequency for one of the collimated beams may be swept or moved through the range of frequencies, while the frequency of the other collimated beam is kept constant.

Also, in other advantageous embodiments, the range of frequencies each collimated beam is made to sweep may be different. The range or magnitude of the frequency sweep selected in this example is such that the response will provide optimized information about identifying a particular object in real life.

Figure 5:
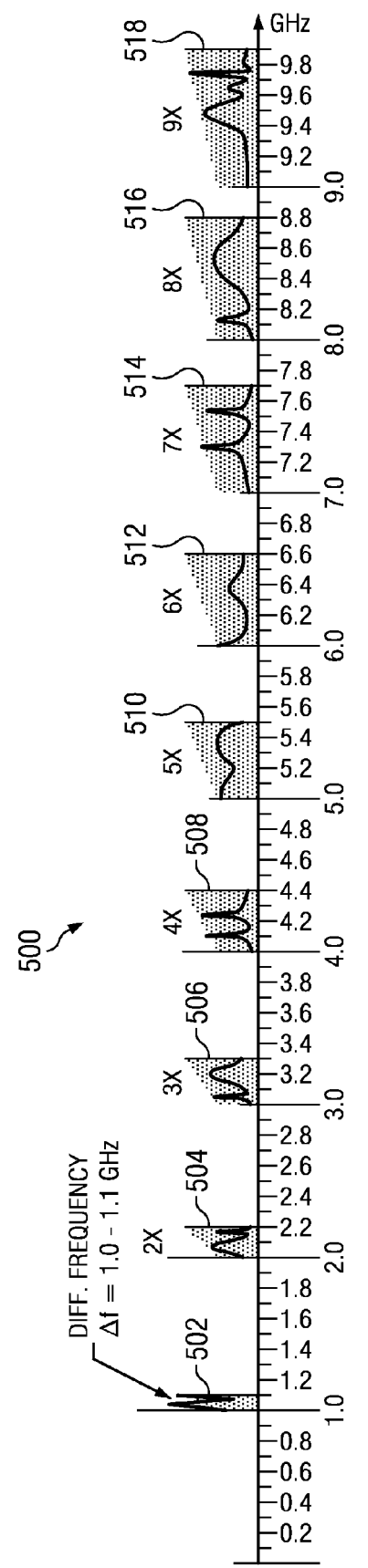
FIG. 5 is a diagram illustrating an example of responses detected by a receiver with parallel synchronous detecting channels in accordance with an advantageous embodiment.

Turning now to FIG. 5, a diagram illustrating an example of responses detected by a receiver with parallel synchronous detecting channels is depicted in accordance with an advantageous embodiment. Graph 500 illustrates signals for a fundamental difference frequency, as well as harmonics of the fundamental difference frequency. The X-axis represents frequencies in gigahertz, while the Y-axis represents the amplitude of the signal.

The fundamental frequency is the difference frequency. Response 502 illustrates the response for the fundamental frequency. Responses 504, 506, 508, 510, 512, 514, 516, and 518 are responses of the higher harmonics received in the different channels.

For example, response 504 is the second harmonic, response 506 is the third harmonic, response 508 is the fourth harmonic, response 510 is the fifth harmonic, response 512 is the sixth harmonic, response 514 is the seventh harmonic, response 516 is the eighth harmonic, and response 518 is the ninth harmonic.

Of course, depending on the particular implementation, other numbers of harmonic responses may be detected. For example, in some advantageous embodiments, only one harmonic may be used, while in others, 10, 12, or 15 harmonics could be used. Still, in certain applications, odd harmonics or only the even harmonics may be used, without the even or odd harmonics. All of these responses form a response, such as response 134 in FIG. 1. The shape and characteristics of the different responses are only provided for purposes of illustration and may differ, depending on the particular object from which the responses are obtained.

Figure 6:
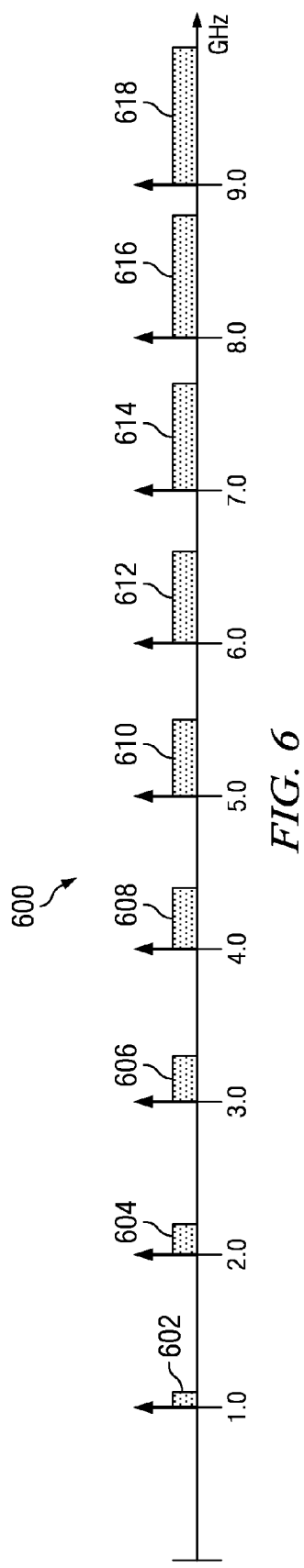
FIG. 6 is a diagram illustrating output from a reference signal generator with rich harmonic content in accordance with an advantageous embodiment.

Turning now to FIG. 6, a diagram illustrating output from a reference signal generator with rich harmonic content is depicted in accordance with an advantageous embodiment. In these examples, rich harmonic content means that many harmonics are present rather than one or two harmonics. Graph 600 illustrates signals that may be generated from a single difference frequency ($\Delta f$) using, for example, harmonic "picket". In other words, the signals may be evenly spaced on the frequency domain. In the illustrative examples, the X-axis represents frequency in gigahertz, while the Y-axis represents the amplitudes of the signals.

Outputs 602, 604, 606, 608, 610, 612, 614, 616, and 618 are examples of outputs that may be present in the difference frequency and harmonics of the difference frequency in the field reradiated from the illuminated object. In these examples, each output indicates a change in frequency as a range of frequencies, such as range of frequencies 160 in FIG. 1. As can be seen in this example, output 602 is the selected difference frequency. The other outputs are harmonics of the selected difference frequency for the two collimated beams.

Figure 7:
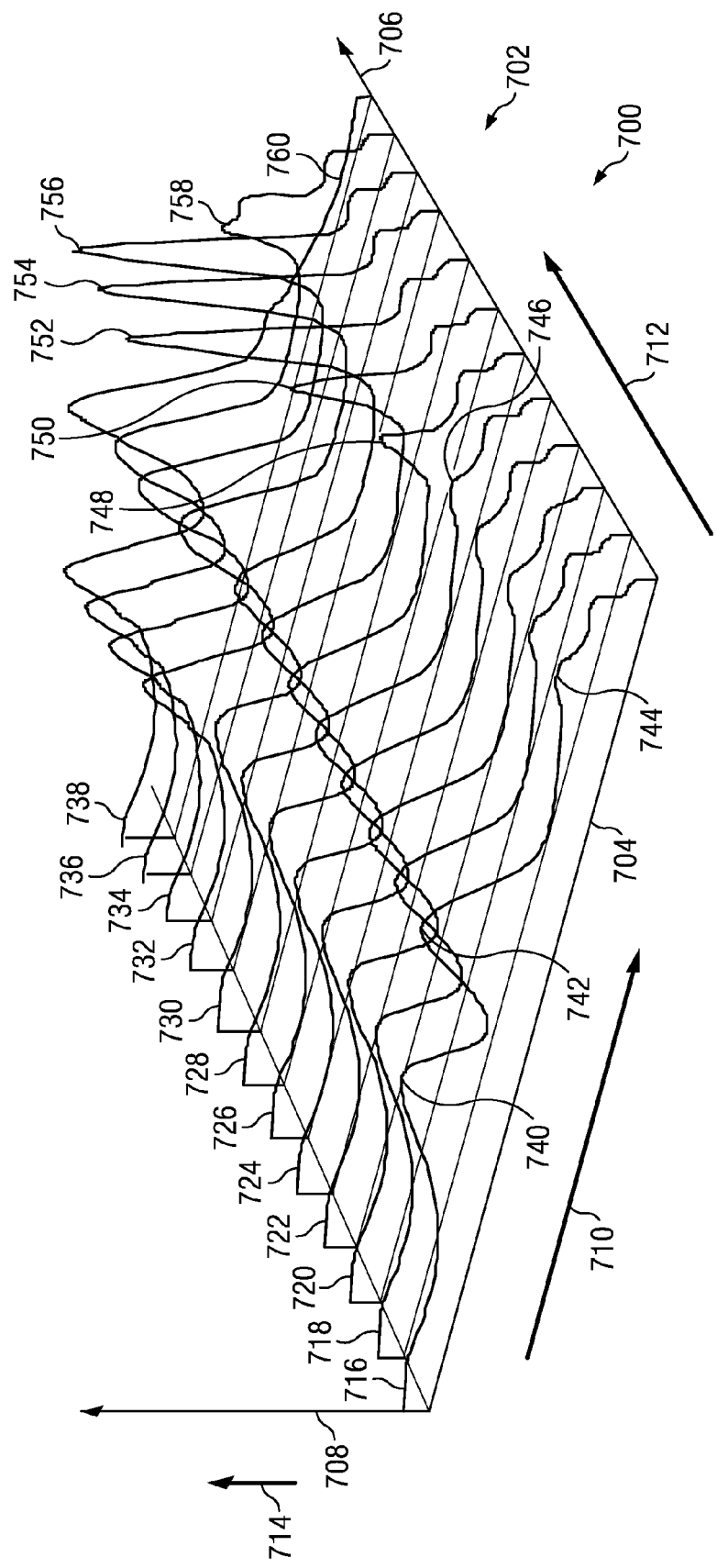
FIG. 7 is a diagram illustrating an example of a response in accordance with an advantageous embodiment.

With reference now to FIG. 7, a diagram illustrating an example of a response is depicted in accordance with an advantageous embodiment. In this illustrative example, response 700 is an example of response 134 in FIG. 1. In this illustrative example, response 700 takes the form of a plurality of two-dimensional signals for a fundamental difference frequency.

In this illustrative example, response 700 is depicted as graph 702 of a two-dimensional array of data points. In response 700, frequency is shown along axis 704, and power level is shown on axis 706. Axis 708 indicates the strength of the signal. The frequency increases in the direction of arrow 710 on axis 704. The power level increases in the direction of arrow 712 on axis 706. Further, the signal strength increases in the direction of arrow 714 on axis 708.

In this illustrative example, graph 702 depicts a plurality of signals for a range of increasing difference frequencies for a plurality of power levels. Each of lines 716, 718, 720, 722, 724, 726, 728, 730, 732, 734, 736, and 738 represents one of these signals for a range of difference frequencies at a different power level.

As can be seen in this depicted example, the characteristics of the lines change as the power level changes. In this illustrative example, points such as 740, 742, and 744 in line 716 may represent components having non-linear electrical characteristics. As the power level changes, the characteristics of each line may change.

For example, points 746, 748, 750, 752, 754, 756, 758, and 760 corresponding to lines 724, 726, 728, 730, 732, 734, 736, and 738 correspond to each other with respect to axis 704. In these illustrative examples, the intensity for these corresponding points changes as the power level increases.

Point 754 on line 732 indicates a power level that saturates the particular component corresponding to that point. Point 756 on line 734 indicates that the component is starting to break down. Point 758 on line 736 indicates that damage has occurred in the component in the object. Further, point 760 on line 738 indicates that the component in the object has been further damaged with the signal at point 760 being further degraded.

In some illustrative examples, as the power increases, the signal peaks associated with components may become degraded and eventually eliminated. The degradation or elimination of a signal peak may indicate that the particular component has been damaged and/or destroyed in these examples.

In this manner, an operator may be able to identify when an object has been damaged or destroyed. Further, based on object profiles, the operator may be able to identify the particular component that has been damaged.

The illustration of response 700 is only provided as an example of a presentation of a portion of response 134 in FIG. 1. In other illustrative examples, response 700 may include two-dimensional signals similar to the signals depicted in graph 702 for each of the number of harmonics of the fundamental difference frequency signal. These signals may have characteristics different from the signals for the fundamental difference frequency. Further, other numbers of power levels other than those shown may be used in these illustrative examples.

Figure 8:
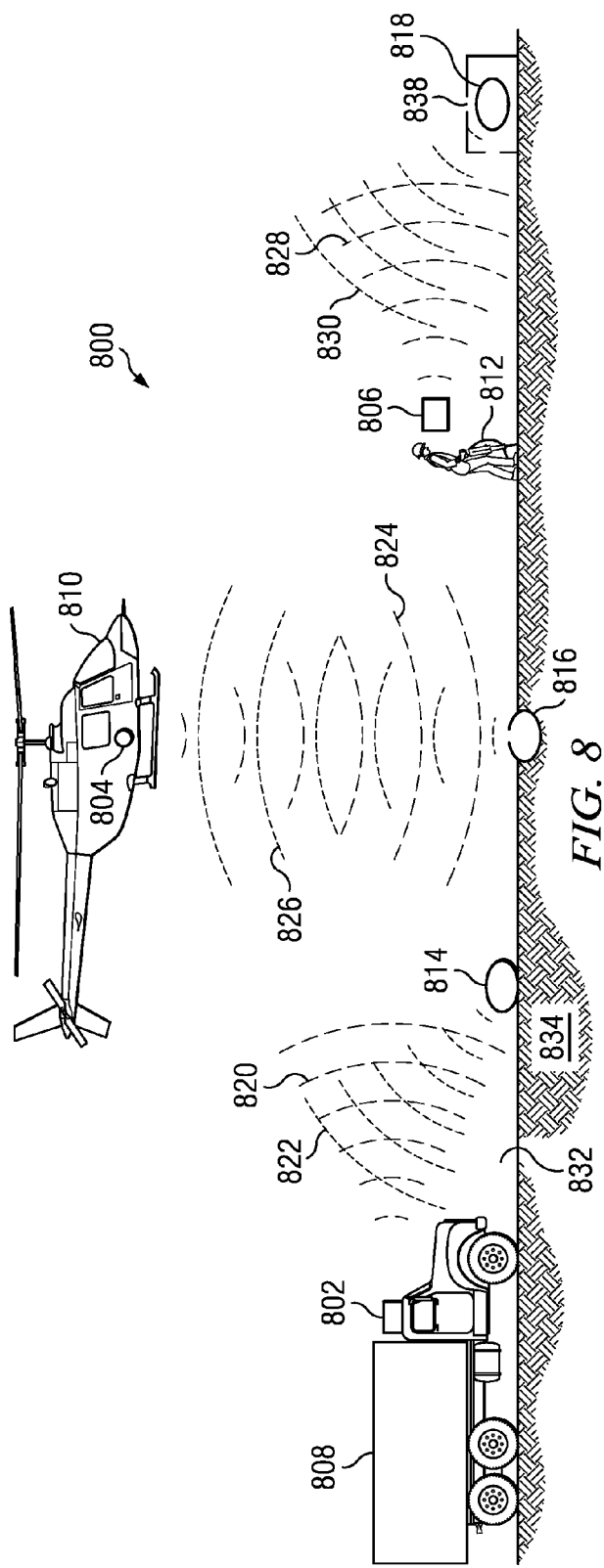
FIG. 8 is a diagram illustrating various detection environments in accordance with an advantageous embodiment.

Turning now to FIG. 8, a diagram illustrating various detection environments is depicted in accordance with an advantageous embodiment. Environment 800 is an example of one implementation for detection environment 100 in FIG. 1. In this illustrative example, three types of detection environments are shown in environment 800 and may include detection systems 802, 804, and 806, which are mounted on platforms in the form of truck 808, helicopter 810, and portable instrument 812.

These detection systems may be used to detect objects, such as objects 814, 816, and 818. Further, these detection systems also may be used to identify the different objects in the detection environments in environment 800. Detection system 802 may generate electromagnetic signals 820 in the form of two collimated beams, which may encounter object 814. In response to object 814 having electrical non-linear characteristics, response 822 is generated and detected by the receiver part of detection system 802.

In a similar fashion, detection system 804 in helicopter 810 generates electromagnetic signals 824 in the form of two collimated beams that overlap at object 816. In these examples, electromagnetic signals 824 may be millimeter wave range signals. If object 816 has electrical non-linear characteristics, response 826 is generated and detected by the receiver part of detection system 804.

Detection system 806 in portable housing 812 also generates electromagnetic signals 828 in the form of two collimated beams. Object 818 generates response 830 if object 818 has electrical non-linear characteristics. Response 830 is detected by the receiver part of detection system 806. These different detection systems also may identify the objects detected. Further, if objects 814, 816, and 818 are visible, detecting locations of the objects may be unnecessary. Instead, the different signals may be used to identify the objects.

In this illustrative example, object 814 may be on surface 832 of ground 834. Object 816 may be under surface 832 of ground 834. Object 818 may be hidden within box 838.

Figure 9:
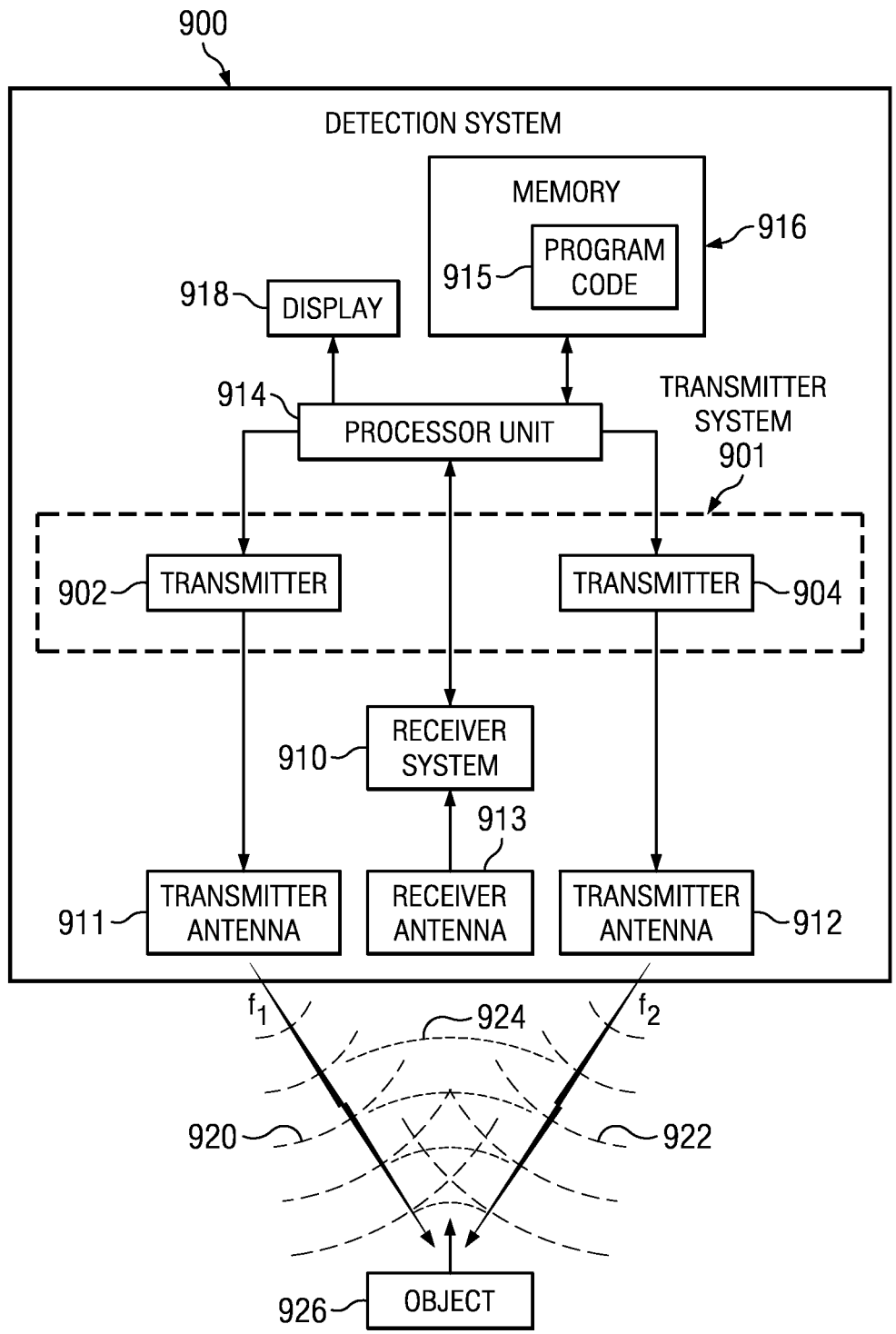
FIG. 9 is a block diagram of a detection system in accordance with an advantageous embodiment.

With reference now to FIG. 9, a block diagram of a detection system is depicted in accordance with an advantageous embodiment. Detection system 900 is an example of one implementation for detection system 102 in FIG. 1. In this illustrative example, detection system 900 is an example of an apparatus that may be implemented in various platforms for use in detecting and/or identifying objects.

In this illustrative example, detection system 900 includes transmitter system 901 with transmitter 902 and transmitter 904 and receiver system 910. Detection system 900 also includes transmitter antenna 911, transmitter antenna 912, and receiver antenna 913. Processor unit 914, memory 916, and display 918 also are located in detection system 900.

Processor unit 914 executes program code 915 stored in memory 916 to control the operation of detection system 900 in these illustrative examples. Of course, in other advantageous embodiments, processor unit 914 may be an application specific integrated circuit (ASIC) that does not need program code to operate detection system 900.

Transmitter antennas 911 and 912 receive electromagnetic energy from transmitters 902 and 904, respectively, and radiate the electromagnetic energy as electromagnetic signals in collimated beams 920 and 922 in these illustrative examples. Depending on the implementation, a single antenna may be used in place of transmitter antennas 911 and 912. Transmitters 902 and 904 may be designed to share a single antenna in this type of implementation. Response signals 924 collected by receiver antenna 913 are routed to receiver system 910. Receiver system 910 filters and/or amplifies response signals 924 for further processing. This processing may include interpretation, storage, and display data for response signals 924.

In these examples, transmitter 902 and transmitter 904 are capable of generating electromagnetic signals emitted as collimated beam 920 and collimated beam 922 having characteristics. These characteristics may include, for example, without limitation, frequency, amplitude, polarization, and/or other suitable attributes.

For example, transmitter 902 may generate electromagnetic signals for collimated beam 920 that are emitted by transmitter antenna 911 with the first frequency f1. Transmitter 904 may generate electromagnetic signals for collimated beam 922 that are emitted by transmitter antenna 912 with the second frequency f2.

The frequencies and amplitudes at which transmitters 902 and 904 generate collimated beams 920 and 922 are controlled by processor unit 914 in these examples. Processor unit 914 acts as a controller to generate collimated beams 920 and 922 in these examples. Information about response signals 924 may be used to help determine the resonant nature (the Q) of objects with non-linear electrical characteristics, which, in turn, may be used to identify object 926.

Processor unit 914 may perform these and other operations based on program code 915 stored in memory 916. Characteristics of response signals 924 received by receiver system 910 may be displayed on display 918. Further, display 918 also may provide other information, such as that which may be used to identify object 926, the range or location of object 926, the orientation of object 926, the depth of object 926 in the ground, and/or other suitable information.

Receiver system 910 is designed to detect signals at the difference frequency of the dual beams of the transmitter system and at harmonics of the difference frequency.

Additionally, processor unit 914 also sets receiver system 910 to detect a range of difference frequency signals through which response signals 924 from object 926 are expected. Further, receiver system 910 also may be set to detect harmonics of the difference frequency between frequency f1 and frequency f2.

The difference between the first frequency f1 and the second frequency f2 is equal to a difference frequency that is set for receiver system 910 in these examples. Additionally, receiver system 910 also is set to receive harmonics of the difference frequencies. The frequency selected for transmitters 902 and 904 are such that they do not affect the electronics in receiver system 910. Receiver system 910 is not configured or programmed to detect signals at the frequencies set for transmitters 902 and 904. Receiver system 910 is designed to be sensitive only to the difference frequency and harmonics of the difference frequency in these illustrative examples.

As an example, transmitter 902 may be set to transmit at around 90.5 gigahertz, while transmitter 904 may be set to transmit at around 91.5 gigahertz. The difference between these two frequencies is around 1.0 gigahertz. As an example, transmitter 902 may be set to sweep the frequency from 90.5 gigahertz through a range of frequencies downward by 50 megahertz to around 90.45 gigahertz.

Transmitter 904 may be operated to simultaneously sweep the frequency through a range of frequencies from around 91.5 gigahertz to around 91.55 gigahertz. Receiver system 910 is set to detect signals at around 1 gigahertz to around 1.1 gigahertz.

When electromagnetic signals in collimated beams 920 and 922 reach object 926, currents at the millimeter wave frequencies are induced within conductive and semi-conductive parts of object 926. Some of these induced currents will be rectified and converted to currents with difference frequency $\Delta f$ in portions of the conductive parts of object 926 with non-linear electrical characteristics. These currents with frequency $\Delta f$ will result in the generation of an electromagnetic signal, such as a reradiated electromagnetic field, in the form of response signals 924. Response signals 924 are captured by receiver antenna 913 in these examples.

Receiver system 910 detects response signals 924 and sends this data to processor unit 914 for processing and analysis. In these examples, receiver system 910 does not detect electromagnetic signals reflected from object 926 and other surfaces at the frequencies of collimated beams 920 and 922, because receiver system 910 is set only to detect a frequency that is the difference between the frequency transmitted by transmitter 902 and the frequency transmitted by transmitter 904 and the harmonic frequencies for this difference frequency.

The non-linear electrical characteristics are found in objects, such as improvised explosive devices. Electrical non-linearities may be present in these objects because of circuits that are present that have electrical non-linearities. These circuits usually include diodes, transistors, and/or other components that have electrical non-linearities. The non-linear electrical characteristics within the object causes a response signal that has a frequency equal to the difference between the two transmitted signals to be returned. This response is detected by receiver system 910 in this example. The response detected by receiver system 910 also includes harmonics for the difference frequency in these illustrative examples.

In these examples, the penetration of electromagnetic fields of collimated beams 920 and 922 in materials increases as the frequencies used decrease. Resolution, however, decreases as well, as the frequencies decrease. More specifically, the spatial resolution decreases. In this illustrative example, transmitter 902 and transmitter 904 may continuously transmit at frequencies f1 and f2. With this type of operation, receiver system 910 detects the frequency that is the difference between these two frequencies along with the harmonics of that frequency.

As a result, response signals 924, when detected by receiver system 910, are processed by processor unit 914 indicating the presence of and/or to identify object 926. Response signals 924 also may be used to identify object 926. Further, with the movement of detection system 900 in a direction relative to object 926, the shape, orientation, and/or distance of object 926 may be identified through continued detection of response signals 924. This information may be stored by processor unit 914 and memory 916 as readings together with location (position) readings as taken by detection system 900.

Response signals 924 may be compared to a database or a library of profiles for objects. This comparison may be performed to identify object 926. Further, depending on the particular implementation, the orientation or positioning of object 926 also may be identified.

Further, processor unit 914 may set receiver system 910 to detect signals within a range of difference frequencies. In this manner, if additional objects in addition to object 926 are located with different electrical non-linear characteristics at various distances, these objects also may be detected and distinguished from one another by detection system 900.

Figure 10:
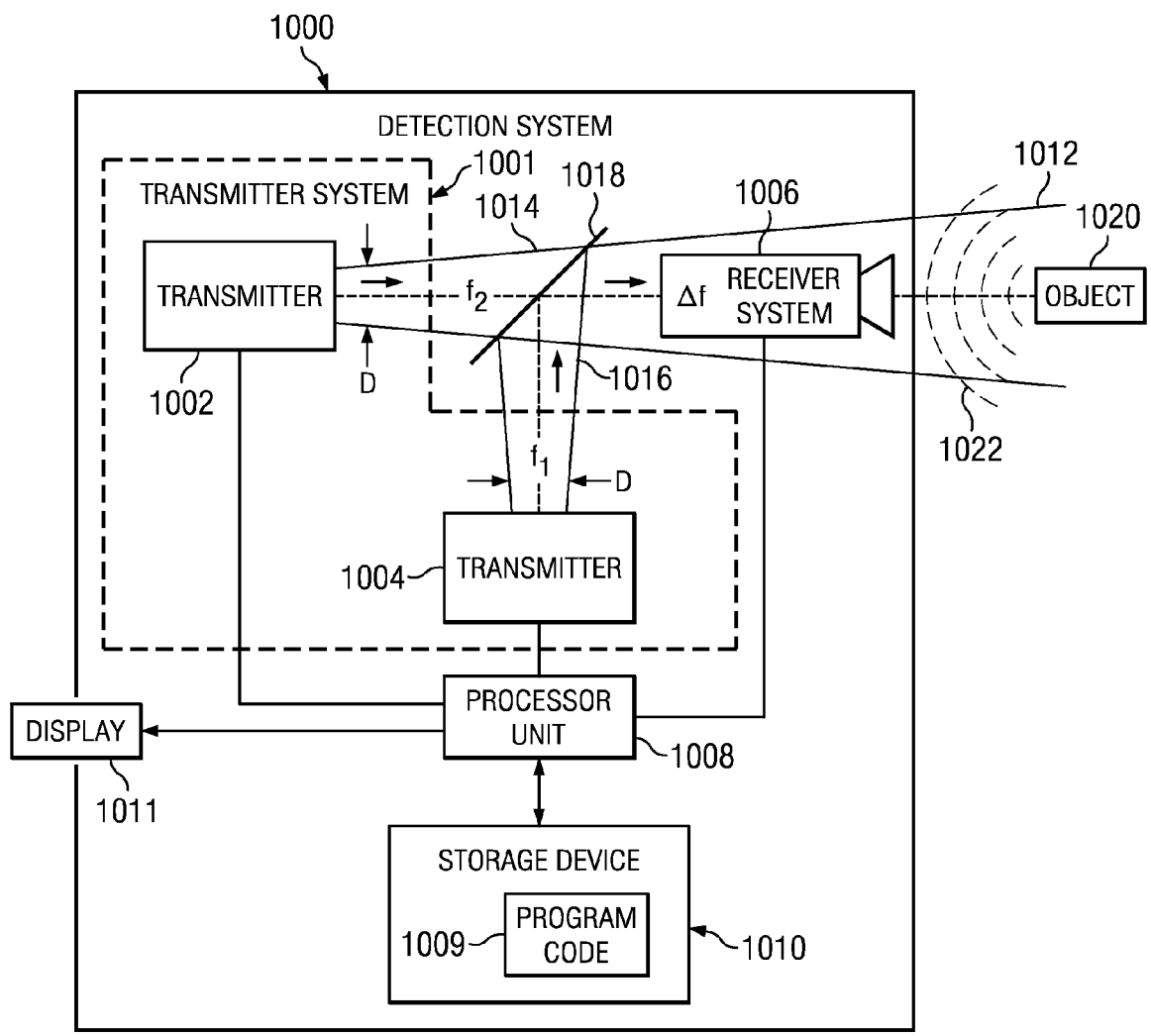
FIG. 10 is a diagram illustrating a detection system in accordance with an advantageous embodiment.

With reference next to FIG. 10, a diagram illustrating a detection system is depicted in accordance with an advantageous embodiment. In this illustrative example, detection system 1000 is an example of another implementation of detection system 102 in FIG. 1.

In this particular example, detection system 1000 includes transmitter system 1001 with transmitter 1002, transmitter 1004, and receiver system 1006. Detection system 1000 also includes processor unit 1008, storage device 1010, and display 1011.

Processor unit 1008 operates to control transmitter 1002 and transmitter 1004. Further, processor unit 1008 receives data for signals detected by receiver system 1006. Processor unit 1008 executes program code 1009 that may be located in storage device 1010. Results of response signals detected by receiver system 1006 may be presented on display 1011.

In this illustrative example, detection system 1000 generates electromagnetic signals in the form of a single beam, beam 1012. Beam 1012 is generated through a combination of collimated beams 1014 and 1016, which are generated by transmitter 1002 and transmitter 1004, respectively. Collimated beams 1014 and 1016 also may be linearly polarized.

Transmitter 1004 generates collimated beam 1016 with a first frequency f1. Transmitter 1002 generates collimated beam 1014 with a second frequency f2. These two beams are combined into beam 1012 using beam combiner 1018.

In this depicted example, beam 1012 is a combined circularly polarized beam with an interference difference frequency. This interference difference frequency is the difference between frequency f1 generated by transmitter 1004 and frequency f2 generated by transmitter 1002. Beam 1012 may be directed towards object 1020, which may be on the surface of the ground, buried in the ground, and/or obscured by another object in these examples. Object 1020 has electrical non-linear characteristics that cause currents at the difference frequency to be induced in object 1020.

Electromagnetic signals may be emitted from these currents in the form of response signal 1022. Object 1020 generates response signal 1022 with a frequency that is the difference between frequency f1 generated by transmitter 1004 and frequency f2 generated by transmitter 1002. This frequency is also referred to as a difference frequency or the fundamental frequency. In these illustrative examples, transmitter 1002 and transmitter 1004 may be controlled by processor unit 1008 to transmit collimated beam 1014 and collimated beam 1016 through a range of frequencies based off of frequency f1 and frequency f2.

Response signal 1022 is detected by receiver system 1006, which sends the information in response signal 1022 to processor unit 1008 for processing. Response signal 1022 has a frequency that is a difference between frequency f1 and frequency f2. Further, this difference frequency also changes through a range of frequencies based on the sweeping of frequencies to frequency f1 and frequency f2.

Additionally, receiver system 1006 also detects the different harmonics of the difference frequency in response signal 1022. Processor unit 1008 may store information received in response signal 1022 in storage device 1010. Additionally, processor unit 1008 may display this information in display 1011 in detection system 1000.

In detection system 1000, beam 1012 is a directed beam that may be used to search an area that has a radius or diameter for beam 1012. As a result, when a signal, such as response signal 1022, is received by receiver system 1006, a user of detection system 1000 is able to identify object 1020.

Figure 11:
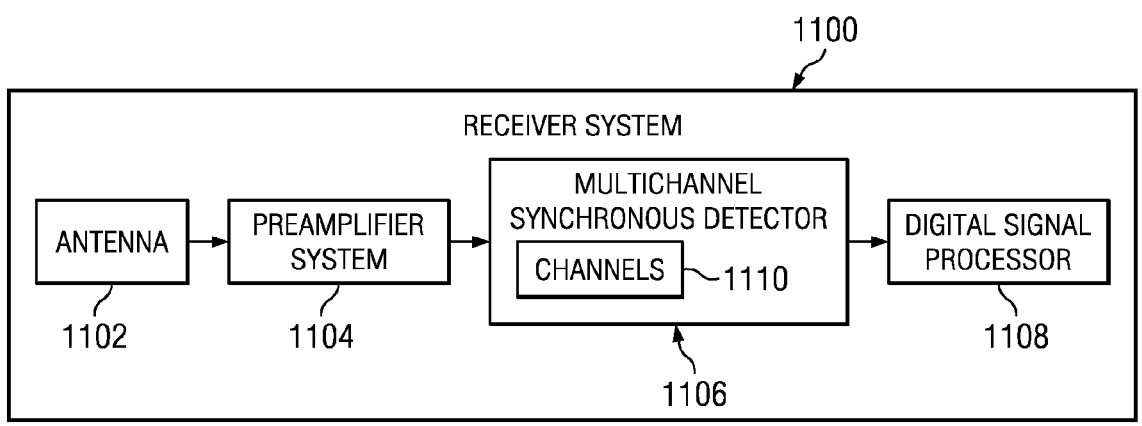
FIG. 11 is a diagram illustrating a receiver system in accordance with an advantageous embodiment.

With reference now to FIG. 11, a diagram illustrating a receiver system is depicted in accordance with an advantageous embodiment. Receiver system 1100 is an example of one implementation of receiver system 110 in FIG. 1.

In this illustrative example, receiver system 1100 includes antenna 1102, preamplifier system 1104, multichannel synchronous detector 1106, and digital signal processor 1108. Antenna 1102 receives response signals generated by collimated beams from the transmitters. Preamplifier system 1104 amplifies signals received by antenna 1102. Multichannel synchronous detector 1106 detects the portion of the signal in the difference frequency.

As described above, the difference frequency is the difference between the frequencies used by the transmitters in the collimated beams. In these illustrative examples, multichannel synchronous detector 1106 contains channels 1110. These channels may each include the components necessary to process a portion of the signal at a selected frequency or range of frequencies. Each portion of the signal also may be referred to as a band. Thus, each channel processes a band, and the receiver can be referred to as a multi-band receiver.

Channels 1110 process frequency bands. In these illustrative examples, these frequencies are the difference frequency and harmonics.

The responses by multichannel synchronous detector 1106 are sent to digital signal processor 1108 for processing. These responses also may be amplified and/or filtered by multichannel synchronous detector 1106. The processed signal may then be used by the processor unit to detect the presence of an object and/or identify the object. Of course, in some advantageous embodiments, digital signal processor 1108 may be part of the processing unit rather than located within receiver system 1100.

Figure 12:
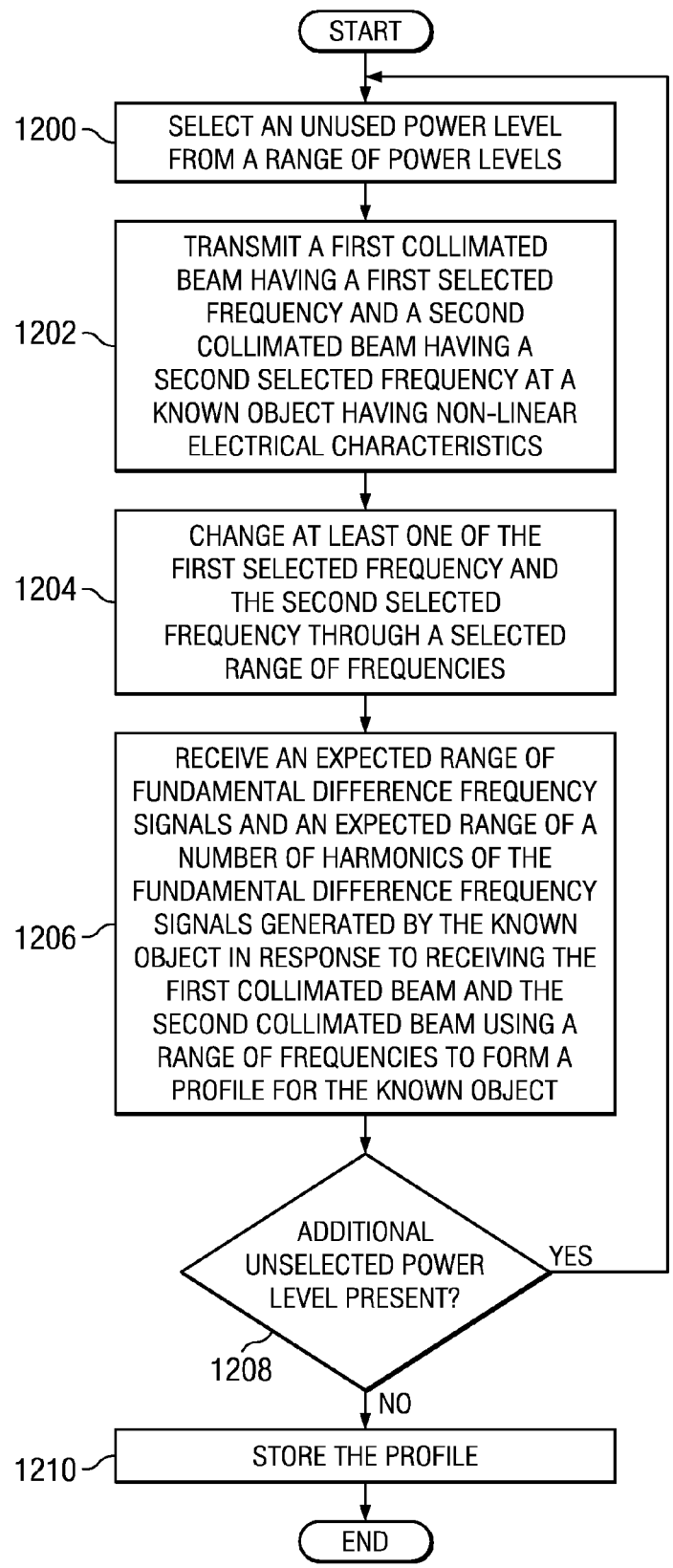
FIG. 12 is a flowchart of a process for creating a profile of an object in accordance with an advantageous embodiment.

With reference next to FIG. 12, a flowchart of a process for creating a profile of an object is depicted in accordance with an advantageous embodiment. The process in FIG. 12 may be implemented in detection environment 100 in FIG. 1 to create profiles used to identify objects.

The process begins by selecting an unused power level from a range of power levels (operation 1200). The process then transmits a first collimated beam having a first selected frequency and a second collimated beam having a second selected frequency at a known object having non-linear electrical characteristics (operation 1202). The process then changes at least one of the first selected frequency and the second selected frequency through a selected range of frequencies (operation 1204). In operation 1202, at least one of the two frequencies may be changed and/or swept through the selected range of frequencies.

The process then receives an expected range of fundamental difference frequency signals and an expected range of a number of harmonics of the fundamental difference frequency signals generated by the known object in response to receiving the first collimated beam and the second collimated beam using a range of frequencies to form a profile for the known object (operation 1206).

Thereafter, the process determines whether an additional unselected power level is present in the range of power levels (operation 1208). If an additional unselected power level is present, the process returns to operation 1200 as discussed above. Otherwise, the profile is stored (operation 1210), with the process terminating thereafter.

The process in FIG. 12 may be performed for any number of objects. Further, this process may be performed in a number of different orientations for the same object. The different orientations allow for more information to be available to more accurately identify an object. Also, this information also may be used to identify the orientation of an unknown object relative to the detector apparatus.

Further, the selection of power levels in operation 1200 may be performed in a number of different ways. In the illustrative examples, the power levels are selected sequentially. In other words, one power level is selected and used, then the next power level that is greater or less than the used power level is selected. This selection sequence is followed through the entire range of power levels. In other advantageous embodiments, the power levels may be selected out of order or sequence.

Figure 13:
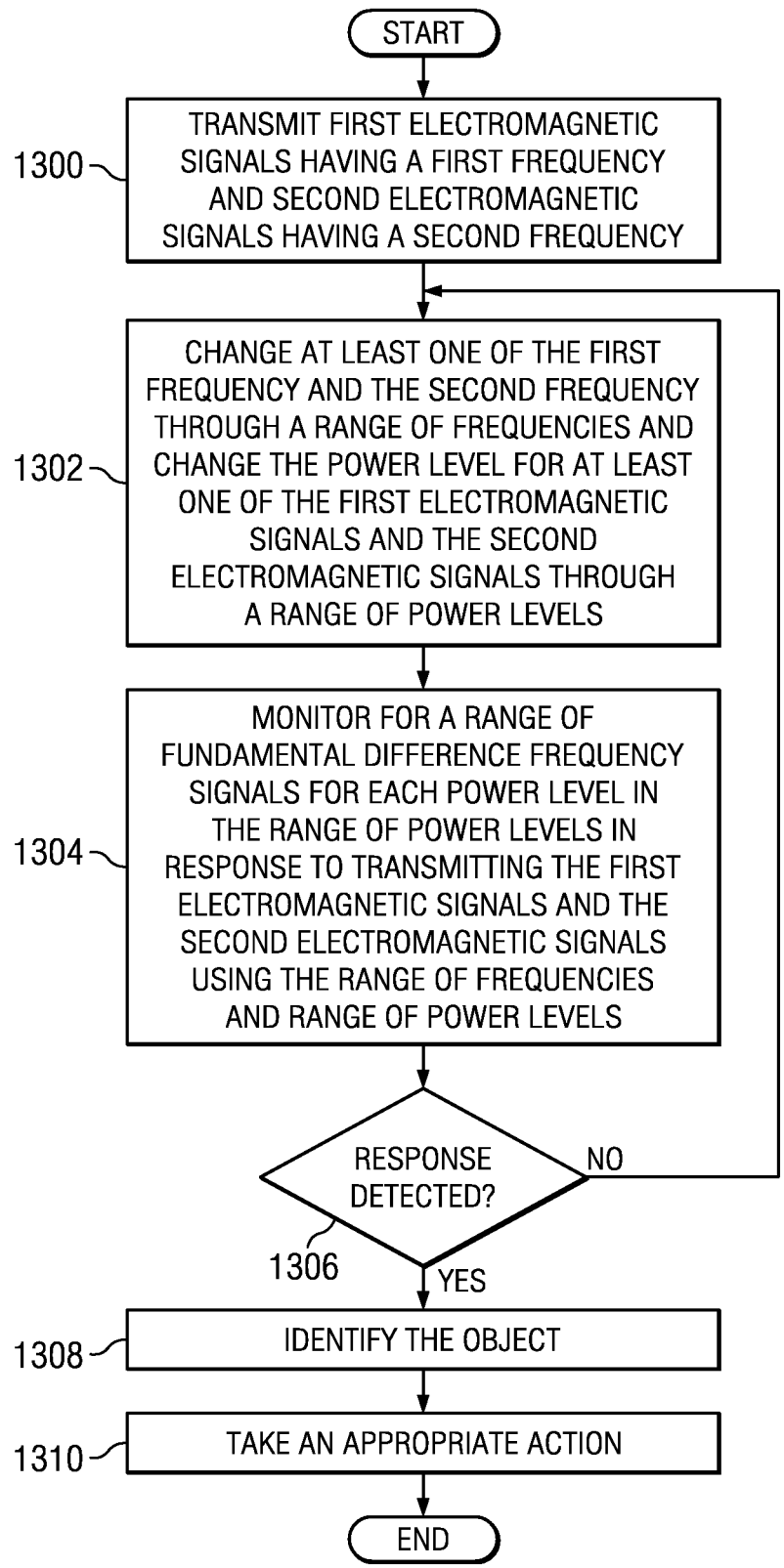
FIG. 13 is a flowchart of a process for detecting objects in accordance with an advantageous embodiment.

With reference now to FIG. 13, a flowchart of a process for detecting objects is depicted in accordance with an advantageous embodiment. The process illustrated in FIG. 13 may be implemented in detection environment 100 in FIG. 1. More specifically, the process illustrated in this example may be implemented in detection system 102 within detection environment 100.

The process begins by transmitting first electromagnetic signals having a first frequency and second electromagnetic signals having a second frequency (operation 1300). In these illustrative examples, these electromagnetic signals may take the form of collimated beams. Of course, the electromagnetic signals may take other forms in other advantageous embodiments.

The process then changes at least one of the first frequency and the second frequency through a range of frequencies and changes the power level for at least one of the first electromagnetic signals and the second electromagnetic signals through a range of power levels (operation 1302). The process then monitors for a range of fundamental difference frequency signals for each power level in the range of power levels in response to transmitting the first electromagnetic signals and the second electromagnetic signals using the range of frequencies and range of power levels (operation 1304). The range of fundamental difference frequency signals is generated by an object having non-linear electrical characteristics in response to receiving the first electromagnetic signals and the second electromagnetic signals.

A determination is made as to whether a response has been detected (operation 1306). If a response is not detected, the process returns to operation 1302. Otherwise, the object is identified (operation 1308). In identifying the object, the object may be identified as a particular object by comparing the response to a profile or other information for known objects. The object also may be identified as an unknown object if a match is not found with information for known objects. Further, the response may be analyzed to identify the object.

After the object is identified, an appropriate action is taken (operation 1310), with the process terminating thereafter. These actions may include, for example, without limitation, avoiding the object, destroying the object, retrieving the object, sending an alert about the object, and/or other suitable operations.

Figure 14:
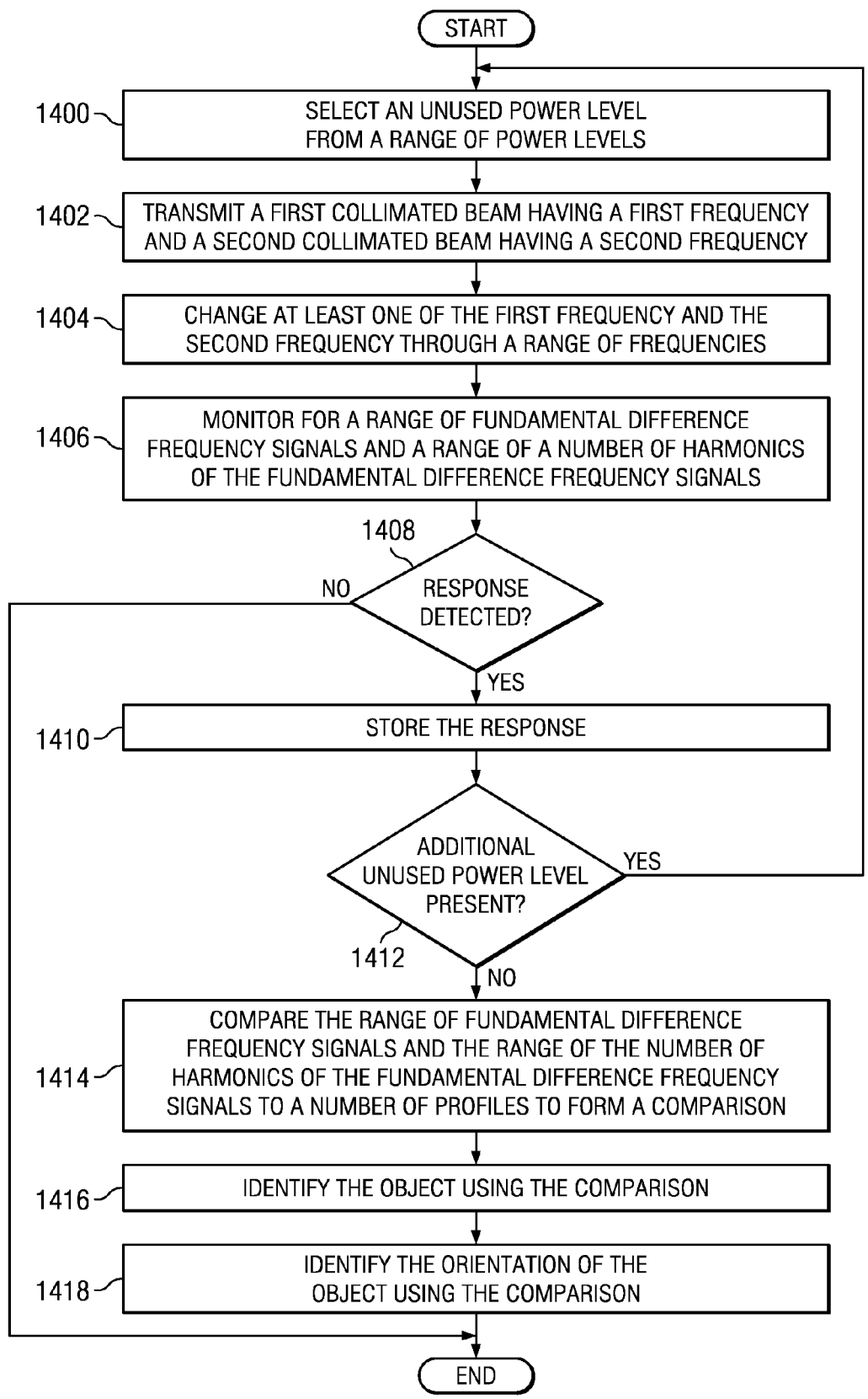
FIG. 14 is a flowchart of a process for detecting objects in accordance with an advantageous embodiment.

With reference now to FIG. 14, a flowchart of a process for detecting objects is depicted in accordance with an advantageous embodiment. The process illustrated in FIG. 14 may be implemented in detection environment 100 in FIG. 1. In particular, the different operations may be performed using detection system 102 in detection environment 100.

The process begins by selecting an unused power level from a range of power levels (operation 1400). Next, the process transmits a first collimated beam having a first frequency and a second collimated beam having a second frequency (operation 1402). Thereafter, the process changes at least one of the first frequency and the second frequency through a range of frequencies (operation 1404). In operation 1404, the frequency of at least one of the first frequency and the second frequency is changed using the frequencies as identified in the range of frequencies.

In these examples, the frequency starts at one end of the range and moves to the other end of the range in a sweep fashion. Depending on the implementation, both the first frequency and the second frequency may be assigned a portion of the range from which changes to both frequencies are made. In yet other examples, only one of the frequencies is changed using the range.

The process monitors for a range of fundamental difference frequency signals and a range of a number of harmonics of the fundamental difference frequency signals (operation 1406). Each of these radio frequency signals is a harmonic of the range of fundamental difference frequency signals generated by an object having non-linear electrical characteristics in response to receiving the first collimated beam and the second collimated beam using the range of frequencies.

The process determines whether a response is detected in response to the transmission of the first collimated beam and the second collimated beam (operation 1408). If a response is not detected, the process terminates.

If a response is detected, the response is stored (operation 1410). The process then determines whether an additional unused power level is present in the range of power levels (operation 1412). If an additional unused power level is present, the process returns to operation 1400 to select another unused power level from the range of power levels.

Otherwise, the range of fundamental difference frequency signals and the range of the number of harmonics of the fundamental difference frequency signals are compared to a number of profiles to form a comparison (operation 1414). The object is identified using the comparison (operation 1416). The orientation of the object also may be identified using the comparison (operation 1418), with the process terminating thereafter.

Figure 15:
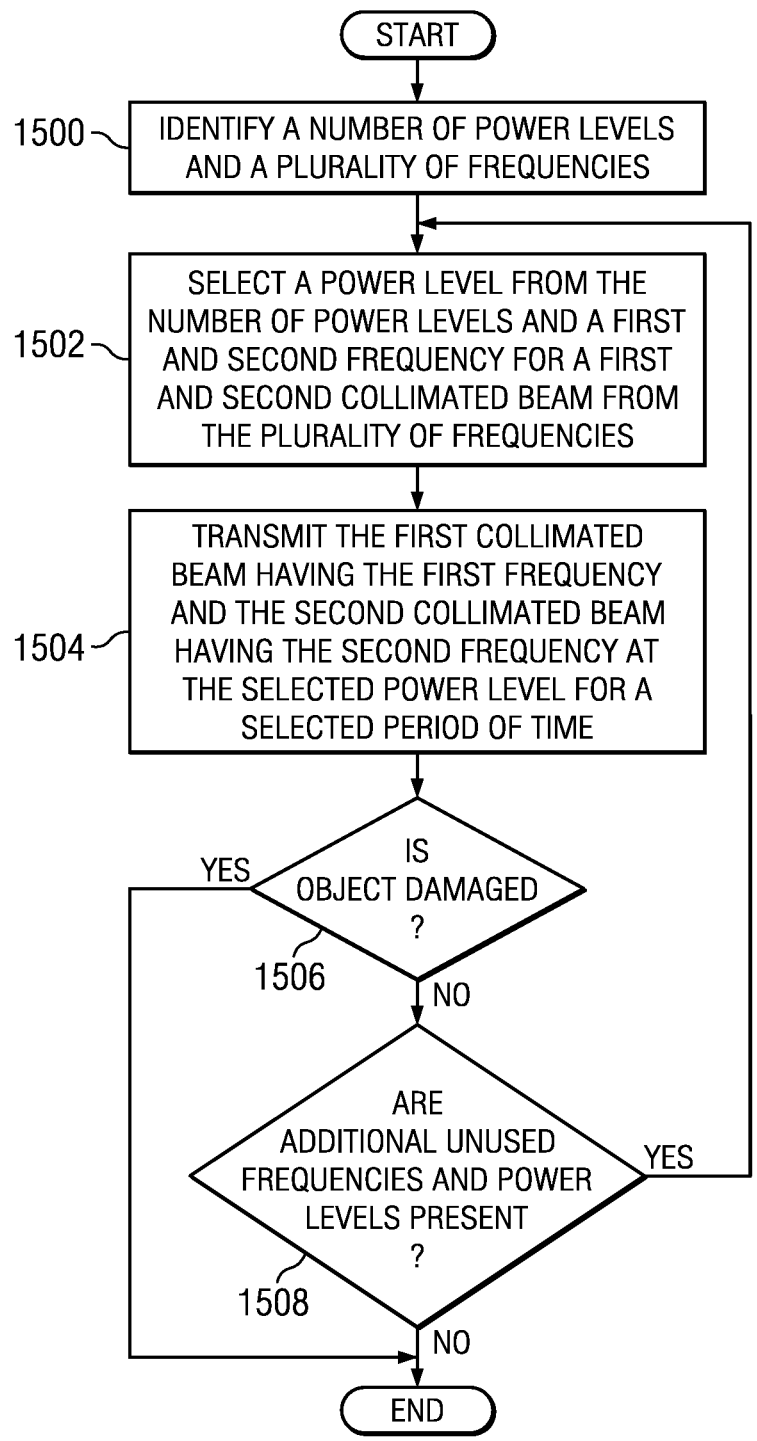
FIG. 15 is a flowchart of a process for damaging an object in accordance with an advantageous embodiment.

With reference now to FIG. 15, a flowchart of a process for damaging an object is depicted in accordance with an advantageous embodiment. The process illustrated in FIG. 15 may be implemented in detection environment 100 using detection system 102 in FIG. 1. This process may be used after an object has been identified using the process illustrated in FIG. 12.

The process may begin by identifying a number of power levels and a plurality of frequencies (operation 1500). The number of power levels and the plurality of frequencies may be ones that correspond to power levels and frequencies that may damage an object.

The process then selects a power level from the number of power levels and a first and second frequency for a first and second collimated beam from the plurality of frequencies (operation 1502). Thereafter, the process transmits the first collimated beam having the first frequency and the second collimated beam having the second frequency at the selected power level for a selected period of time (operation 1504).

The process then determines whether the object has been damaged using the selected power level (operation 1506). If the object has been damaged, the process terminates. Otherwise, the process determines whether additional unused power levels and frequencies are present (operation 1508). If additional unused power levels and frequencies are present, the process returns to operation 1502. In some advantageous embodiments, when the object is undamaged by the currently selected power level, the process may select a new power level that is higher than the currently selected power level upon returning to operation 1502. With reference again to operation 1508, if additional unused power levels or frequencies are not present, the process terminates.

The process illustrated in FIG. 15 may be used to damage one or more components in an object. The damage may, for example, without limitation, cause the object to become inoperable, explode, have less functionality, and/or some other desired result.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, in some advantageous embodiments, operation 1410 may be omitted. In other advantageous embodiments, operations 1408 and 1410 may be performed in a different order or at the same time.

Thus, the different advantageous embodiments provide a method and apparatus for detecting objects. These objects may be detected using an apparatus comprising a transmitter system, a receiver system, and a processor unit. In the different advantageous embodiments, the transmitter system may transmit electromagnetic signals in the form of two collimated beams having different frequencies.

The response generated when an object having a number of non-linear characteristics is a response having a difference frequency. Further, in addition to the difference frequency, harmonics of the difference frequency also may be identified. These different frequencies, the difference frequency and the harmonics of the difference frequency, will be used to identify the object. Further, the different advantageous embodiments use a range of frequencies to provide information to identify the object.

Additionally, the different advantageous embodiments transmit the electromagnetic signals at different power levels to provide additional information for identifying objects. Further, the transmission of the electromagnetic signals may be at frequencies and power levels selected to damage the object. This operation may be performed after the object has been identified.

The description of the different advantageous embodiments has been presented for purposes of illustration and description, and it is not intended to be exhaustive or limited to the embodiments in the form disclosed. Many modifications and variations will be apparent to those of ordinary skill in the art.

All of the different advantageous embodiments have been described with respect to improvised explosive devices, but the different advantageous embodiments may be used to detect any type of object. For example, the different advantageous embodiments may be used to identify improvised nuclear devices, improvised chemical devices, improvised biological devices, improvised incendiary devices, mines, radio transmitters, cell phones, vehicles, computers, and any other object that may have non-linear electrical characteristics that generate responses to collimated beams having different frequencies.

Although the description of the different illustrative embodiments has been with respect to platforms in the form of a truck, an aircraft, and a portable housing, the different advantageous embodiments may be applied to many other types of platforms, depending on the particular implementation.

For example, without limitation, the different advantageous embodiments may be applied to a mobile platform, a stationary platform, a land-based structure, an aquatic-based structure, a space-based structure, a submarine, a bus, a personnel carrier, a tank, a train, an automobile, a spacecraft, a space station, a satellite, a surface ship, and/or some other suitable platform.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a transmitter system capable of transmitting a first collimated beam having a first frequency and a second collimated beam having a second frequency;
   a target profile database;
   a receiver system capable of monitoring for a fundamental difference frequency signal having a difference frequency equal to a difference between the first frequency and the second frequency, wherein the fundamental difference frequency signal is generated by an object having non-linear electrical characteristics in response to receiving the first collimated beam and the second collimated beam; and
   a processor unit connected to the transmitter system and the receiver system, wherein the processor unit is capable of controlling an operation of the transmitter system and the receiver system to change at least one of the first frequency and the second frequency through a range of frequencies; change a power level of at least one of the first collimated beam and the second collimated beam through a range of power levels; detect a range of fundamental difference frequency signals for each power level in the range of power levels in response to the transmitter system transmitting the first collimated beam and the second collimated beam using the range of frequencies and the range of power levels; compare the fundamental difference frequency signal to the target profile database, and responsive to comparing the fundamental difference signal to the target profile database, determine whether the difference frequency matches an object in the target profile database; responsive to determining that the difference frequency matches a difference frequency in the target profile database, identifying an object corresponding to the difference frequency in the target profile database; responsive to identifying the object, select another power level for the first collimated beam and the second collimated beam, the another power level being selected to damage the object; and transmit at the object the first collimated beam and the second collimated beam at the another power level.

2. The apparatus of claim 1, wherein the range of fundamental difference frequency signals detected for the each power level in the range of power levels forms a response, and wherein the processor unit is capable of identifying the object using the response.

3. The apparatus of claim 1, wherein the receiver system is further capable of monitoring for a number of harmonics of the fundamental difference frequency signal, each of which is a harmonic of the fundamental difference frequency signal in which the number of harmonics of the fundamental difference frequency signal is generated by the object having non-linear electrical characteristics in response to receiving the first collimated beam and the second collimated beam, and wherein the processor unit is further capable of controlling operation of the transmitter system and the receiver system to detect a range of the number of harmonics of the fundamental difference frequency signals for the each power level in the range of power levels in response to the transmitter system transmitting the first collimated beam and the second collimated beam using the range of frequencies.

4. The apparatus of claim 1, wherein the first collimated beam and the second collimated beam are combined into a single beam.

5. The apparatus of claim 1, wherein the receiver system comprises a plurality of channels, wherein the plurality of channels is capable of detecting the fundamental difference frequency signal and a number of harmonics of the fundamental difference frequency signal.

6. The apparatus of claim 1, wherein the object is at a location and is selected from one of under a ground, on the ground, in a structure, and on a person.

7. The apparatus of claim 1, wherein the first collimated beam is a first linearly polarized collimated light beam and the second collimated beam is a second linearly polarized collimated light beam.

8. The apparatus of claim 1 further comprising:
   a platform, wherein the transmitter system, the receiver system, and the processor unit are associated with the platform.

9. The apparatus of claim 1 wherein the processor unit is further capable of controlling an operation of the transmitter system and the receiver system to determine whether the object is damaged after transmitting at the object the first collimated beam and the second collimated beam at the another power level.

10. The apparatus of claim 1 wherein the another power level is in the range of power levels.

11. The apparatus of claim 1 wherein the another power level is outside the range of power levels.

12. The apparatus of claim 1 wherein damage includes at least one of causing the object to become inoperable, causing the object to explode, and causing the object to have less functionality.

13. The apparatus of claim 1 wherein the object is related to an explosive device.

14. The apparatus of claim 1 wherein the object comprises an electronic device.

15. The apparatus of claim 2, wherein the range of fundamental difference frequency signals and a range of the number of harmonics of the fundamental difference frequency signals for the each power level in the range of power levels form the response, and wherein the processor unit is capable of identifying the object using the response.

16. The apparatus of claim 2, wherein the processor unit is capable of comparing the response to a plurality of profiles of known objects.

17. The apparatus of claim 8, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a portable housing, and a building.

18. The apparatus of claim 9 wherein the processor unit is further capable of controlling an operation of the transmitter system and the receiver system to, responsive to the object being undamaged, select a new power level for the first collimated beam and the second collimated beam, the new power level being higher than the another power level, and also to transmit at the object the first collimated beam and the second collimated beam at the new power level.

19. The apparatus of claim 9 wherein the processor unit is further capable of controlling an operation of the transmitter system and the receiver system to, responsive to the object being undamaged, select a first new frequency for the first collimated beam and a second new frequency for the second collimated beam, and also to transmit at the object the first collimated beam and the second collimated beam at the new first frequency and the new second frequency.

20. The apparatus of claim 9 wherein the processor unit is further capable of controlling an operation of the transmitter system and the receiver system to, responsive to the object being undamaged, select a new power level for the first collimated beam and the second collimated beam, select a new first frequency for the first collimated beam, select a new second frequency for the second collimated beam, the new power level being higher than the another power level, and also to transmit at the object the first collimated beam and the second collimated beam at the new power level and at the new first frequency and the new second frequency.

* * * * *